(12) United States Patent
Takanashi et al.

(10) Patent No.: US 6,313,923 B1
(45) Date of Patent: Nov. 6, 2001

(54) IMAGE PROCESSING APPARATUS

(75) Inventors: Teruo Takanashi; Koichi Sugahara; Hirokazu Tsuji, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/168,668

(22) Filed: Oct. 9, 1998

(30) Foreign Application Priority Data

Oct. 9, 1997 (JP) .................................................. 9-277675
Oct. 5, 1998 (JP) ................................................. 10-283085

(51) Int. Cl.⁷ .................................................. G06K 15/00
(52) U.S. Cl. ............................................................ 358/1.18
(58) Field of Search ..................................... 358/1.1, 1.11, 358/1.9, 1.18, 1.13, 1.2, 450, 452; 707/505, 506, 508, 509, 517, 520, 522, 524; 400/61, 62, 65, 67, 76, 77

(56) References Cited

U.S. PATENT DOCUMENTS 5,450,533 * 9/1995 Takahashi et al. .................. 358/1.18
5,878,198 * 3/1999 Yuasa et al. ........................... 358/1.1

* cited by examiner

*Primary Examiner*—Arthur G. Evans
(74) *Attorney, Agent, or Firm*—Sughrue, Mion, Zinn, Macpeak & Seas, PLLC

(57) ABSTRACT

An operator can freely and easily designate a region, which the operator wishes to extract as an image to be outputted from an image, by designating the position and size of a region setting frame by using an enlargement/reduction handle. Accordingly, no carrier or mask is required for this purpose, and the number of parts required can be reduced. Operability at the time of cropping an image can also be improved greatly. Further, by operating rotation buttons and 90°-rotation keys, the operator can, with simple operations, rotate an image displayed as a test image and can freely and easily designate an image within the region setting frame, i.e., an image to be outputted.

25 Claims, 18 Drawing Sheets

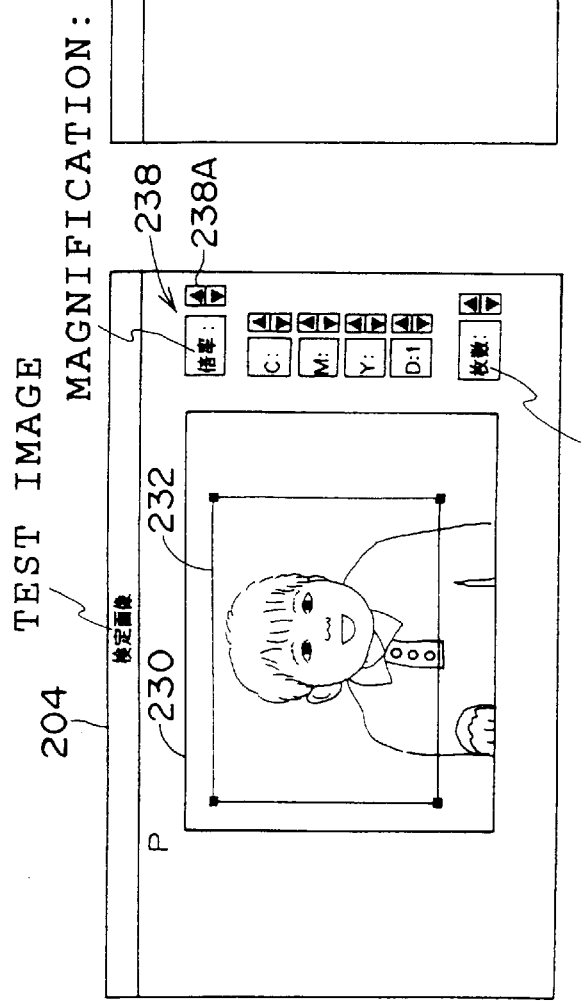

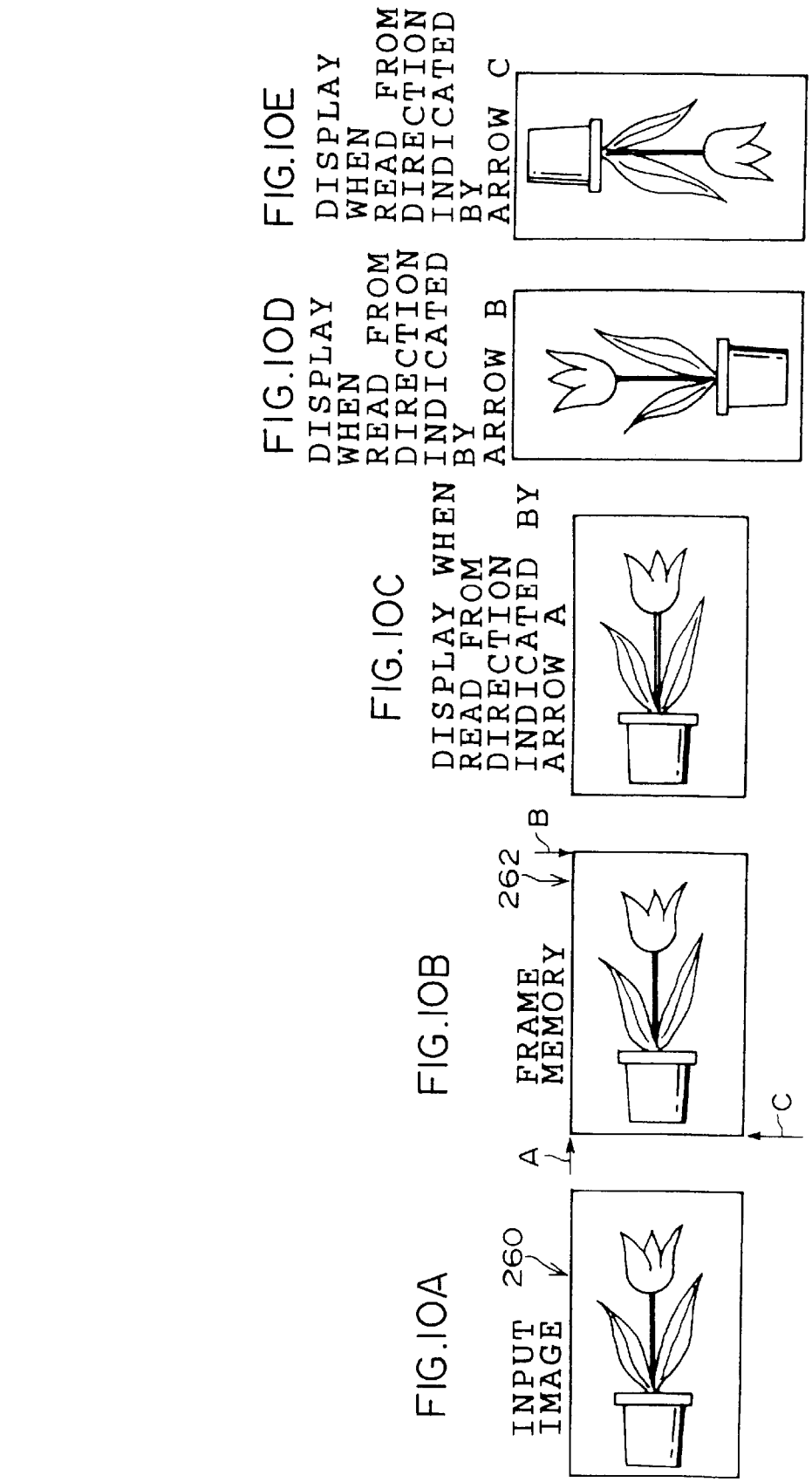

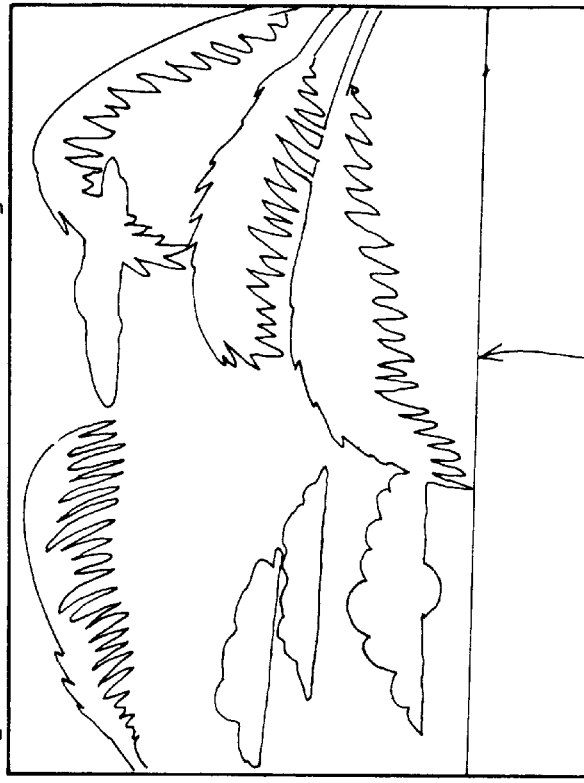
FIG. 15A [INPUT IMAGE]
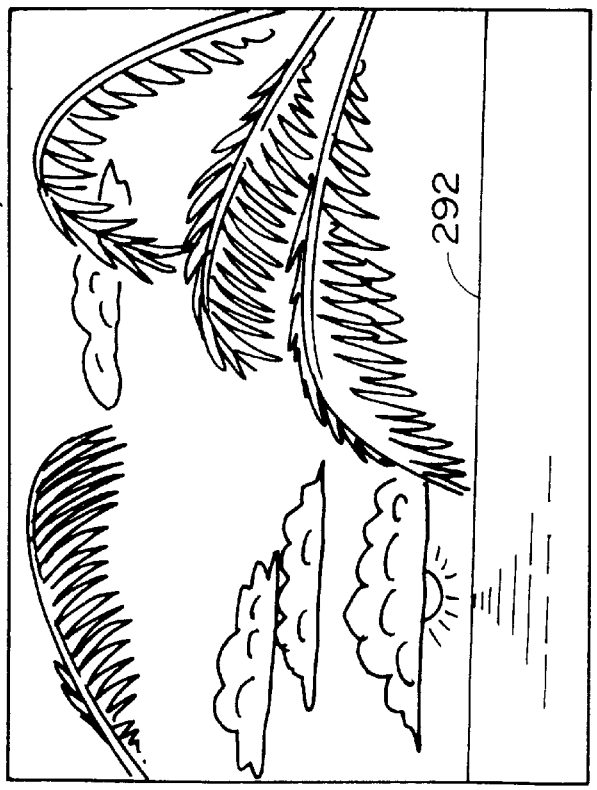
FIG. 15B [STRUCTURAL-LINE DETERMINING IMAGE]

IMAGE PROCESSING APPARATUS

BACKGROUND OF THE INVENTION

1. Field of the Invention

The present invention relates to an image processing apparatus, and particularly to an image processing apparatus in which, based on digital image data of an image recorded on a recording medium, digital image data of an image to be recorded on a recording material is prepared.

2. Description of the Related Art

Conventionally, there has been known image reading technique in which light is irradiated on an image recorded on a photographic film and a reading sensor such as a CCD receives the light transmitted through the image to thereby allow photoelectric reading of the image.

In such image reading technique, for example, when only a partial image region of an image is read (when so-called cropping of an image for cropping is effected), generally, only light transmitted through the partial image region is received by a reading sensor by using a dedicated carrier or mask.

However, one carrier or mask is used to only allow cropping of an image to one fixed size. For this reason, when cropping of an image to a plurality of sizes is effected, a dedicated carrier or mask is required for each size, and therefore, it is necessary to provide a plurality of carriers or masks.

As a result, the number of parts of an apparatus for reading an image increases, and therefore, the cost of the apparatus increases.

Further, exchange of a carrier or mask is required each time the size of an image for cropping is varied. For this reason, an operator's operation at the time of cropping becomes very complicated and a great deal of labor is thereby imposed on the operator.

SUMMARY OF THE INVENTION

The present invention has been devised to solve the above-described drawbacks and an object thereof is to provide an image processing apparatus which can improve operability during cropping of an image and also can reduce the number of parts required.

In order to achieve the above-described object, there is provided an image processing apparatus of a first aspect of the present invention, in which, based on digital image data of an image recorded on a recording medium, digital image data of an image to be recorded onto a recording material is prepared, comprising: information display means which displays information; display control means which allows display, on the information display means, of an image based on digital image data of the image recorded on the recording medium and a region for extracting, from the image recorded on the recording medium, the image to be recorded onto the recording material; region designation means for designating a position and a size of the region; and determination means which determines the image to be recorded onto the recording material based on the region whose position and size are designated by the region designation means.

An image processing apparatus according to a second aspect of the present invention is characterized, in the image processing apparatus of the first aspect of the present invention, by further comprising: magnification designating means for designating a display magnification of an image displayed on the information display means, wherein, when a display magnification is designated by the magnification designating means, on the basis of the designated display magnification, the display control means enlarges or reduces the image displayed on the information display means while the region displayed on the information display means remains fixed.

An image processing apparatus according to a third aspect of the present invention is characterized, in the image processing apparatus of the first aspect of the present invention, by further comprising: rotation instruction means for giving an instruction for rotation, at an arbitrary angle, of an image displayed on the information display means, wherein, based on the instruction by the rotation instruction means, the display control means rotates at an arbitrary angle the image displayed on the information display means, and the determination means determines, based on the region and on the image which has been rotated based on the instruction, the image to be recorded onto the recording material.

An image processing apparatus according to a fourth aspect of the present invention is characterized, in the image processing apparatus of the third aspect of the present invention, by that, when the rotation based on the instruction is effected, the display control means rotates the image displayed on the information display means while the region displayed on the information display means remains fixed.

An image processing apparatus according to a fifth aspect of the present invention is characterized, in the image processing apparatus of the third or fourth aspect of the present invention, by that, during the rotation based on the rotation instruction, the display control means allows display of a simple image which indicates at least orientation of the image.

An image processing apparatus according to a sixth aspect of the present invention is characterized, in the image processing apparatus of any one of the third, fourth, and fifth aspects of the present invention, by that the rotation instruction means includes 90°-rotation instruction means for giving an instruction for rotation by 90° of the image displayed on the information display means.

An image processing apparatus according to a seventh aspect of the present invention is characterized, in the image processing apparatus of any one of the third, fourth, fifth, and sixth aspects of the present invention, by that the rotation instruction means includes reference-line indicating means for indicating a rotation reference line as a reference for rotation of an image, and based on the rotation reference line indicated by the reference-line indicating means, the display control means rotates the image displayed on the information display means.

An image processing apparatus according to an eighth aspect of the present invention is characterized, in the image processing apparatus of any one of the third, fourth, fifth, and sixth aspects of the present invention, by further comprising: reference-line extraction means which, when rotation of an image is indicated by the rotation instruction means, extracts a rotation reference line as a reference for rotation of the image from the image displayed on the information display means, wherein the display control means rotates the image displayed on the information display means based on the rotation reference line extracted by the reference-line extraction means.

An image processing apparatus according to a ninth aspect of the present invention is characterized, in the image processing apparatus of any one of the first to eighth aspects of the present invention, by further comprising: selection means which determines whether an image in a region with no image to be recorded on the recording material being included is to be displayed or not, wherein the display control means displays an image on the information display means based on a display form selected by the selection means.

The image processing apparatus according to the first aspect of the present invention is that in which digital image data of an image recorded on a recording medium such as a photographic film or CD-R (recordable additional compact disk) is used to prepare digital image data of an image (image to be outputted) to be recorded on the recording material.

In such an image processing apparatus, the display control means allows an image based on digital image data of the image recorded on the recording medium and a region for extracting an image to be outputted from the image to be displayed on the information display means (display). At this time, a closing line which shows a border line of the region may be indicated or points which show four corners of the region may also be indicated. Alternatively, the region may also be displayed by varying color or density between the inside and outside of the region.

An operator designates the position and size of the region by the region designating means with the image and the region being displayed on the information display means, so as to designate a region, which is required to be extracted as an image to be outputted, from the image. The determination means determines, as an image (image to be outputted) to be recorded on the recording material, an image region within the region of which position and size have been designated.

As described above, since the operator designates the position and size of the region by the region designating means with the image and the region based on digital image data of the image being displayed, the operator can freely designate a region, which is required to be extracted as an image to be outputted, from the image in a simple manner. For this reason, a dedicated carrier or mask which has been conventionally required, becomes unnecessary and the number of parts to be required can be reduced. Further, operability at the time of cropping an image can be greatly improved.

In the image processing apparatus of the second aspect of the present invention, when the operator sets display magnification of an image to be displayed on the information display means at a desired display magnification by the magnification designating means, the display control means enlarges or reduces the image displayed on the information display means in accordance with the designated display magnification with the region displayed on the information display means being fixed. As a result, the operator can freely designate the display magnification of the image to be displayed on the information display means and can also easily confirm an image region within the region, i.e., an image extracted as an image to be outputted even during enlargement or reduction of an image in accordance with the display magnification, thereby resulting in further improvement of operability at the time of cropping an image.

Further, in the image processing apparatus according to the third aspect of the present invention, an operator can given an instruction for rotation of the image displayed on the information display means at a certain (arbitrary) angle by the rotation instruction means. When the instruction for rotation of the image is given by the operator, the display control means allows rotation of the image displayed on the information display means at a certain (arbitrary) angle based on the instruction.

Accompanied with the above rotation, an image region within the region displayed on the information display means changes, and the determination means determines, as an image to be recorded on the recording material, the image region within the region in the rotated image.

As described above, the operator rotates the image displayed on the information display means at a certain (arbitrary) angle so as to freely change an image region within the region, and can also freely designate an image region, which is required to be extracted as an image to be outputted, from an image in a simple manner.

Meanwhile, when the rotation based on the instruction like the above is effected, as described in the fourth aspect of the present invention, the display control means is preferably provided to rotate the image displayed on the information display means with the region displayed on the information display means being fixed. As a result, the operator can easily confirm an image region within the region, i.e., an image extracted as an image to be outputted even during rotation of the image, so as to further improve operability at the time of cropping an image.

Incidentally, during rotation based on the rotation instruction, it suffices that the operator can at least confirm orientation of the image, and display of an image based on all digital image data of each image is not necessary needed. On the other hand, in order that an image based on all digital image data be displayed during the rotation thereof, image processing for a large amount of digital image data needs be effected in a short time. In this case, the load for image processing increases and provision of an apparatus having a high processing ability becomes necessary.

Accordingly, as described in the fifth aspect of the present invention, during the rotation of an image, the display control means preferably controls so that a simple image which indicates at least orientation of the image is displayed. In this case, no useless image processing is required and the load for image processing can be reduced, and the provision of the apparatus having a high processing ability also becomes unnecessary.

Further, in the sixth aspect of the present invention, the rotation instruction means is provided to include the 90°-rotation instruction means for giving an instruction for rotating an image displayed on the information display means at an angle of 90 degrees. For this reason, by operating the 90°-rotation instruction means only once, the rotation of an image at an angle of 90 degrees can be easily indicated. As a result, operability at the time of cropping is further improved.

When the horizon of a beach, or the like is in an image, it is preferable that orientation of an image be corrected so that the horizon becomes horizontal in the image in the aspect of outward appearance. Most users desire such correction.

In the above case, the seventh and eighth aspects of the present invention are effective. In the image processing apparatus according to the seventh aspect of the present invention, the operator indicates the rotation reference line as a reference for rotation of an image by the reference-line indicating means while viewing an image displayed on the information display means. The kind of the rotation reference line may be a horizontal line, a vertical line, a diagonal line, and the like. The display control means rotates the image displayed on the information display means so that an indicated rotation reference line becomes a proper one, for example, a line segment 270 shown as the rotation reference line in FIG. 13 becomes a horizontal line. As a result, an image is rotated in accordance with the indication of the rotation reference line by the operator and the orientation of the image can be properly corrected accordingly.

In the image processing apparatus according to the eighth aspect of the present invention, when the operator gives an instruction for rotation of an image by the rotation instruction means, the reference-line extraction means automatically extracts the rotation reference line from the image displayed on the information display means. The display control means rotates the image displayed on the information display means so that the extracted rotation reference line becomes a proper one, for example, a line 296 shown as the rotation reference line in FIG. 15B becomes a horizontal line. As described above, since the rotation reference line is automatically extracted due to the instruction for rotation of the image by the operator and the image is rotated in accordance with the extracted rotation reference line, the orientation of the image can be properly corrected.

In the image processing apparatus according to the ninth aspect of the present invention, the operator can determine, by the selection means, whether an image including only a region to be recorded on a recording material or an image including the region to be recorded on a recording material and also including its peripheral region is to be displayed as an image region to be displayed on the information display means (i.e., display). When only the region to be recorded on the recording material is displayed, the operator can confirm a final output image. Further, when the image including the region to be recorded on the recording material and also including its peripheral region is displayed, the position and size of the image region is designated by the region designation means and a region which is desired to be extracted as an output image can be easily designated. At this time, in order to separate the region to be recorded on the recording material and its peripheral region from each other, in the same manner as in the first aspect of the present invention, a closing line which shows a border line of the region may be indicated or points which show four corners of the region may also be indicated. Alternatively, the region may also be displayed by varying color or density between the inside and outside of the region.

BRIEF DESCRIPTION OF THE DRAWINGS

FIG. 9A shows a test image prior to enlarged display thereof; and FIG. 9B shows a test image after enlarged display thereof.

FIG. 10A shows an input image; FIG. 10B is an image diagram of an image corresponding to image data accumulated in a frame memory; FIG. 10C shows an image displayed when image data is read out from the direction indicated by arrow A in FIG. 10B; FIG. 10D shows an image displayed when image data is read out from the direction indicated by arrow B in FIG. 10B; and FIG. 10E shows an image displayed when image data is read out from the direction indicated by arrow C in FIG. 10B.

FIG. 15A is a diagram which shows an example of an input image; and FIG. 15B is a diagram which shows a structural-line determining image prepared from the image shown in FIG. 15A.

DESCRIPTION OF THE PREFERRED EMBODIMENTS

Referring now to the attached drawings, embodiments of the present invention will be hereinafter described.

First Embodiment

Figure 1:
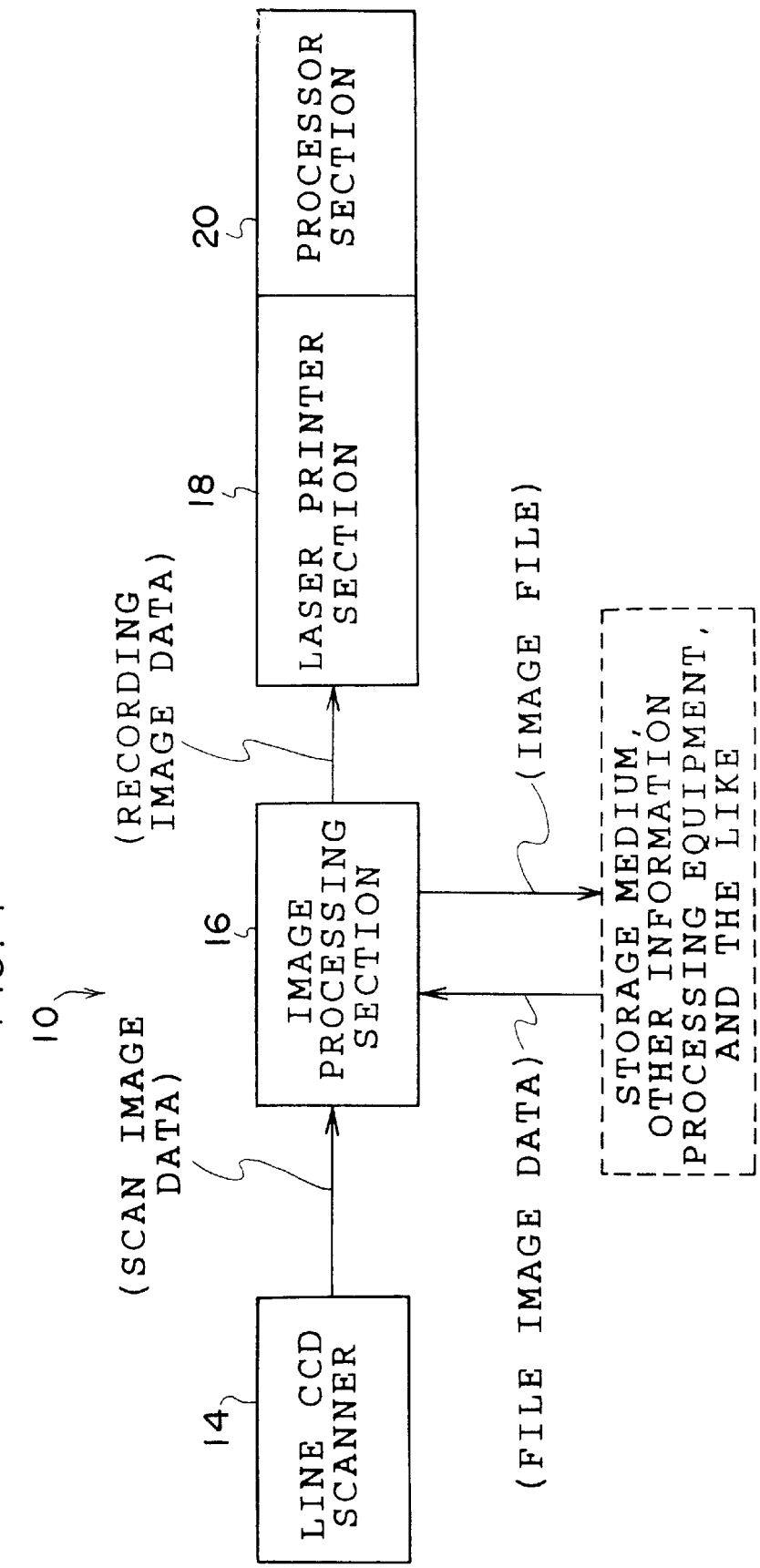
FIG. 1 is a schematic block diagram of a digital laboratory system according to an embodiment of the present invention.
Figure 2:
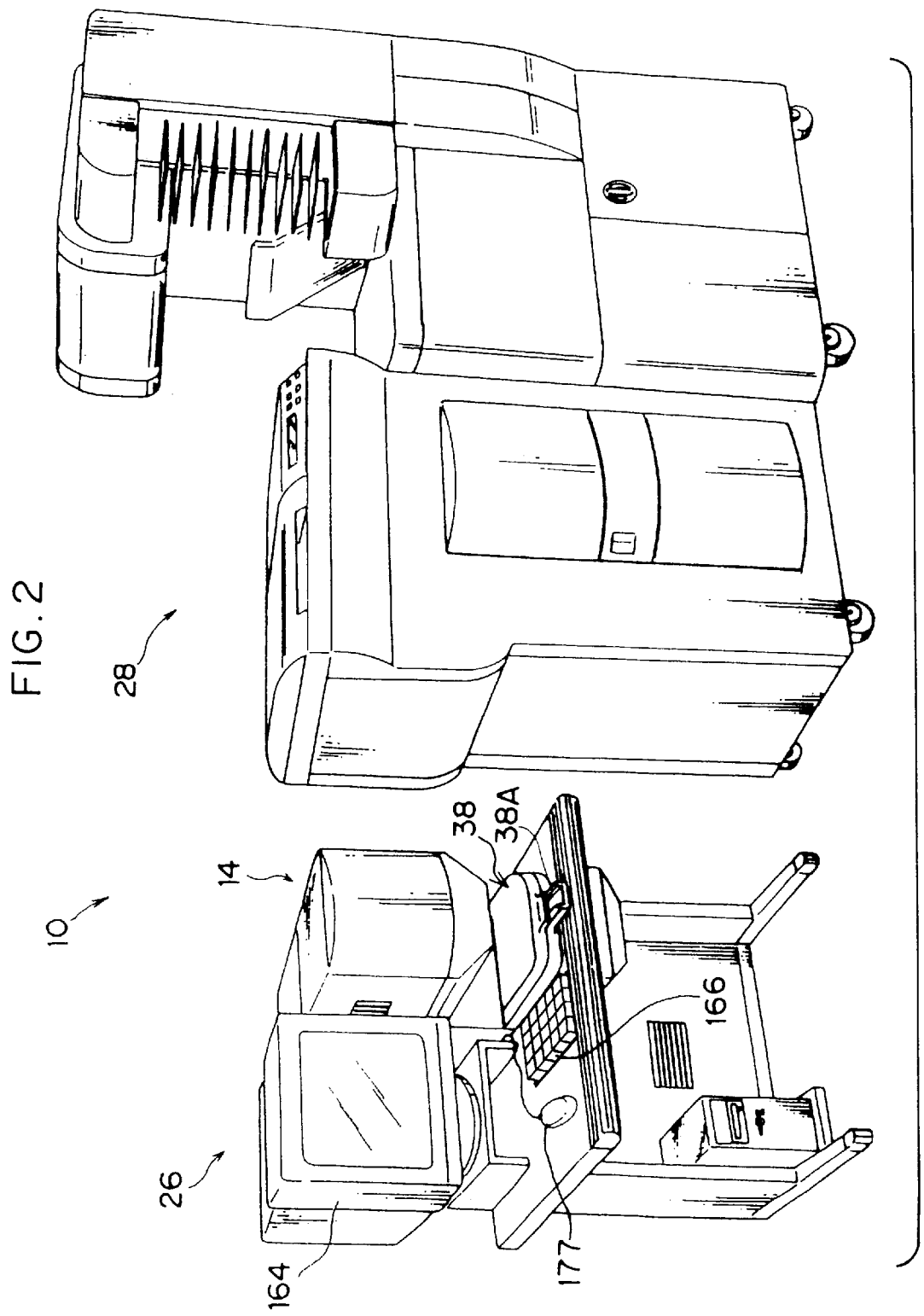
FIG. 2 is an outside view of the digital laboratory system.

A first embodiment of the present invention corresponds to first to sixth aspects of the present invention.
Overview of an entire system:

First, a description will be given of a digital laboratory system according to this embodiment of the present invention. FIG. 1 shows a schematic structure of a digital laboratory system 10 according to this embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2.

The line CCD scanner 14 is used to read an image recorded on a photographic film such as a negative film and a reversal film. Examples of the photographic film on which an image to be read is recorded include a photographic film in 135 magazines, a photographic film in 110 magazines, and a photographic film with a transparent magnetic layer formed thereon (i.e., a photographic film in 1×240 magazines: a so-called APS film), and photographic films in 120 magazines and 220 magazines (Brownie size). The line CCD scanner 14 reads the image to be read, as described above, by a line CCD and outputs image data.

The image processing section 16 is structured to allow input of image data outputted from the line CCD scanner 14 (i.e., scan image data) and also allow input of image data obtained by photographing using a digital camera, image data obtained by reading an original other than an image (for example, an reflection original) by a scanner, image data generated by a computer, and the like (which will be generically referred to as file image data) from the outside (for example, input of image data via a storage medium such as a memory card or input of image data from the other information processing equipment via a communication line).

The image processing section 16 effects image processing including various corrections and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources of R, G, and B and causes laser light modulated to correspond to the recording image data inputted from the image processing section 16 to be irradiated on a photographic printing paper so as to record an image on the photographic printing paper by scan exposure processing. Further, the processor section 20 effects various processes including color development, bleach-fix, washing, and drying for the photographic printing paper on which an image is recorded by scan exposure processing in the laser printer section 18. As a result, an image is formed on the photographic printing paper.

Figure 3:
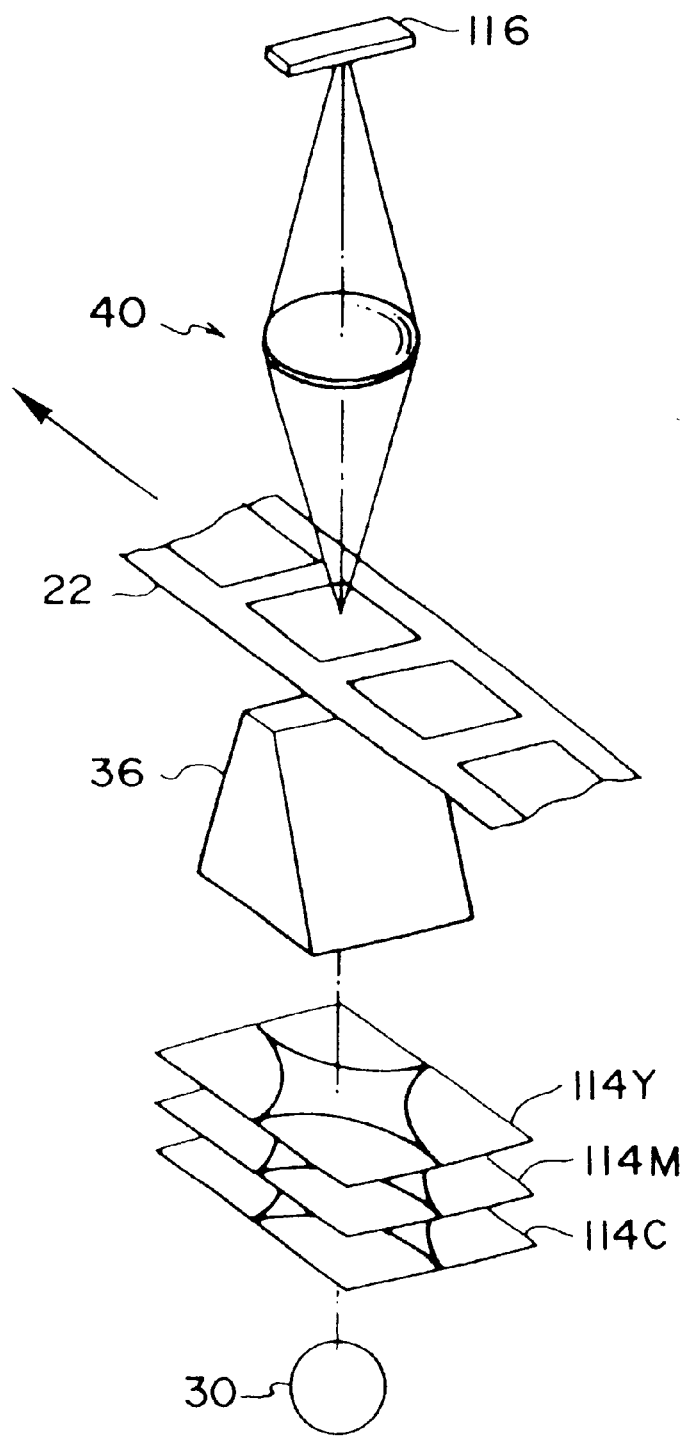
FIG. 3 is a block diagram which schematically shows the structure of an optical system of a line CCD scanner.

Structure of line CCD scanner:

Next, a description will be given of the structure of the line CCD scanner 14. FIG. 3 shows a schematic structure of an optical system of the line CCD scanner 14. This optical system includes a light source 30 comprised of a halogen lamp or a metal halide lamp and applying light to the photographic film 22. A light diffusion box 36 by which light to be irradiated on the photographic film 22 is made into diffused light is disposed at a light emission side of the light source 30.

The photographic film 22 is conveyed by a film carrier 38 (shown in FIG. 5, but not shown in FIG. 3) disposed at a light emission side of the light diffusion box 36 so that the image plane of an image is made perpendicular to an optical axis. In FIG. 3, there is shown an elongated photographic film 22. However, an exclusively-used film carrier is provided for a slide film held by a holder for a slide for each frame (i.e., a reversal film), or an APS film (a film carrier exclusively used for the APS film has a magnetic head for reading information magnetically recorded on a magnetic layer of the film), and these photographic films can also be conveyed.

Light adjusting filters 114C, 114M, and 114Y of cyan (C), magenta (M), and yellow (Y) are disposed between the light source 30 and the light diffusion box 36 sequentially along the optical axis of emitted light. A lens unit 40 which allows imaging of light transmitted through the image and a line CCD 116 are disposed, sequentially along the optical axis, at the side of the photographic film 22 opposite to the side at which the light source 30 is disposed. Although in FIG. 3 a single lens is merely shown as the lens unit 40, the lens unit 40 is actually a zoom lens formed from a plurality of lenses.

The line CCD 116 is structured in such a manner that a sensing portion, in which a large number of CCD cells are disposed in one row and an electronic shutter mechanism is disposed, is provided in each of three lines which are parallel to each other at intervals and color separation filters of R, G, and B are respectively mounted on the light-incidence sides of the sensing portions (i.e., the line CCD 116 is a so-called three-line color CCD). The line CCD 116 is disposed in such a manner that a light receiving surface of each sensing portion coincides with the position of an imaging point of the lens unit 40.

Further, a transfer portion is provided in the vicinity of each sensing portion so as to correspond to the sensing portion. The charge accumulated in each of the CCD cells of each sensing portion is sequentially transferred via a corresponding transfer portion. Although not illustrated, a shutter is provided between the line CCD 116 and the lens unit 40.

Figure 4:
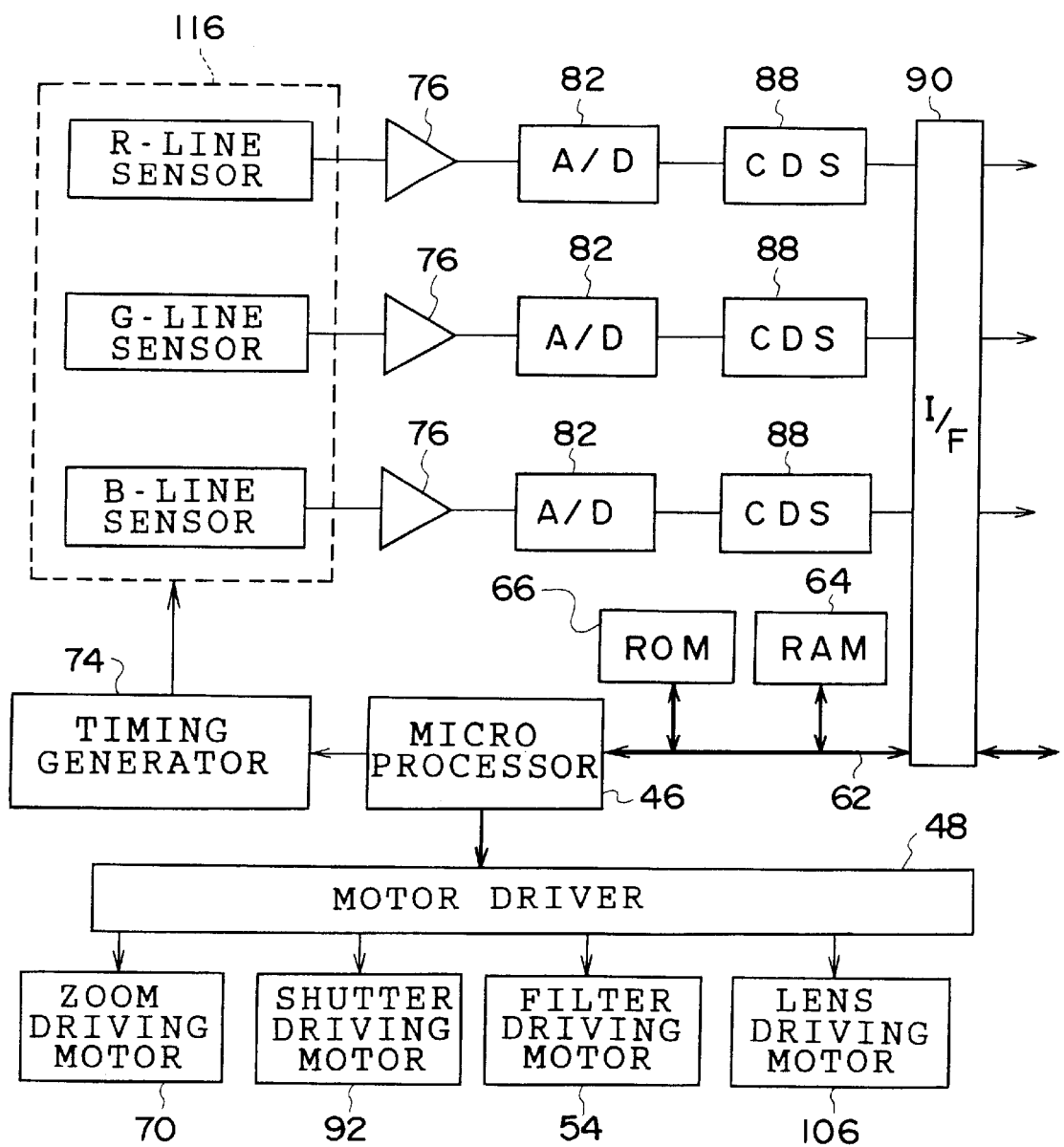
FIG. 4 is a block diagram which schematically shows the structure of an electric system of the line CCD scanner.

FIG. 4 shows a schematic structure of an electric system of the line CCD scanner 14. The line CCD scanner 14 includes a microprocessor 46 which effects control of the entire line CCD scanner 14. RAM 64 (for example, SRAM), ROM 66 (for example, ROM which can rewrite the stored content) are connected via a bus 62 to the microprocessor 46, and a motor driver 48 is also connected to the microprocessor 46. A filter driving motor 54 is connected to the motor driver 48. The filter driving motor 54 allows the light adjusting filters 114C, 114M, and 114Y to slide-move independently.

The microprocessor 46 allows the light source 30 to be turned on and off accompanied with an on-off operation of a power source switch (not shown). Further, during reading of an image by the line CCD 116 (i.e., photometric processing), the microprocessor 46 causes the filter driving motor 54 to slide-move the light adjusting filters 114C, 114M, and 114Y independently, so as to adjust an amount of light made incident on the line CCD 116 for each of light of component colors.

Also connected to the motor driver 48 are a zoom driving motor 70 and a lens driving motor 106. The zoom driving motor 70 varies a zoom magnification of the lens unit 40 by relatively moving the positions of the plurality of lenses of the lens unit 40. The lens driving motor 106 moves the position of an imaging point of the lens unit 40 by moving the entire lens unit 40. The microprocessor 46 varies the zoom magnification of the lens unit 40 by the zoom driving motor 70 to a desired magnification in accordance with a size of an image or with or without cropping made.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76 and the signals outputted from the line CCD 116 are amplified by the amplifiers 76 and are converted to digital data in the A/D converters 82.

The output ends of the A/D converters 82 are each connected to an interface (I/F) circuit 90 via a correlated double sampling circuit (CDS) 88. The CDS 88 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 90.

Meanwhile, photometric signals of R, G, and B are outputted concurrently from the line CCD 116, and therefore, three signal processing systems each including the amplifiers 76, the A/D converters 82, and CDSs 88 are provided and image data of R, G, and B are concurrently outputted, as scan image data, from the I/F circuit 90.

Further, a shutter driving motor 92 which opens and closes the shutter is connected to the motor driver 48. The dark output level of the line CCD 116 is corrected in an image processing section 16 at a subsequent stage, and when reading of the image is not effected, the dark output level can be obtained by the microprocessor 46 closing the shutter.

Figure 5:
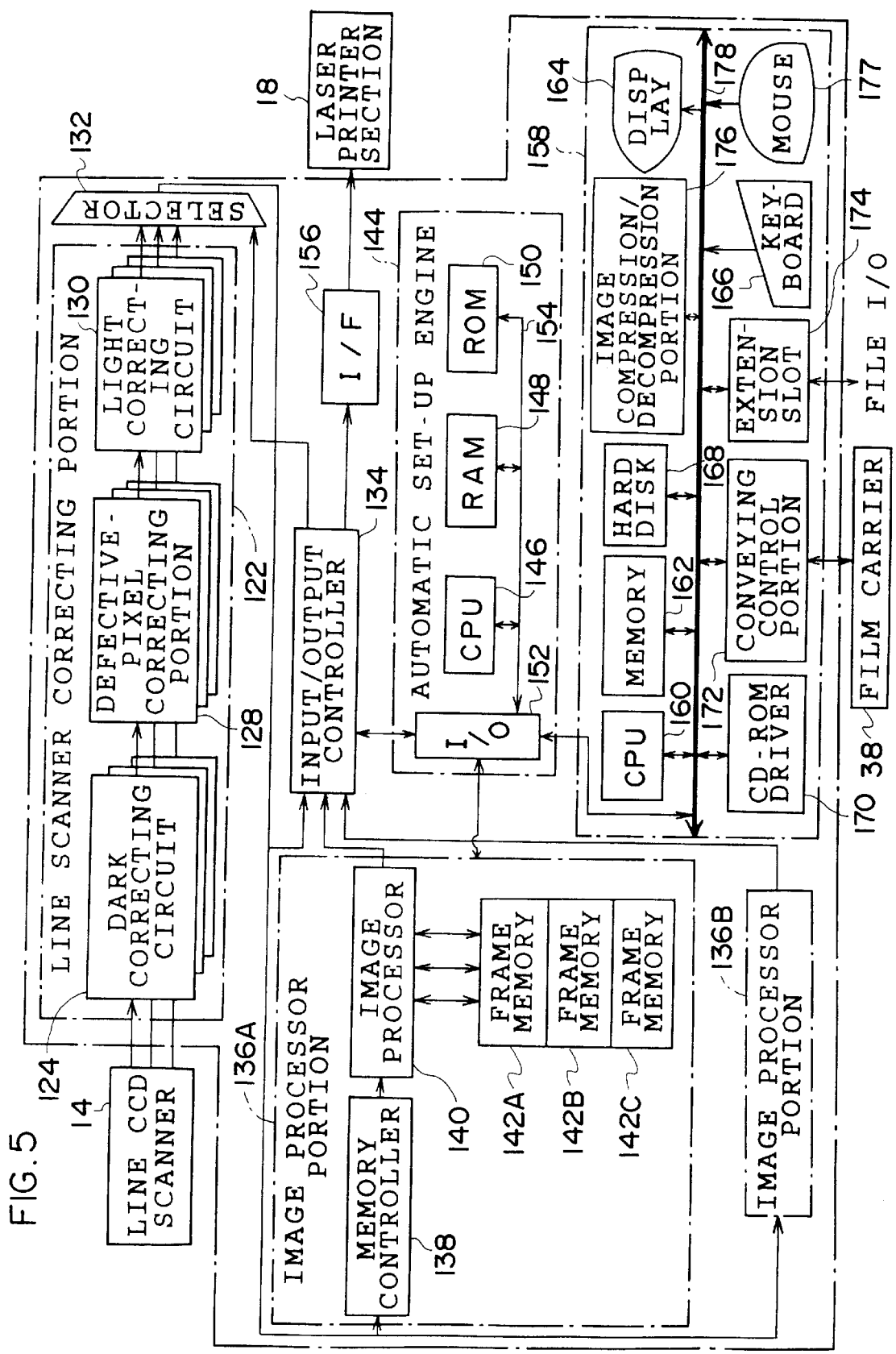
FIG. 5 is a block diagram which schematically shows the structure of an image processing section.

Structure of image processing section:

Next, a description will be given of the structure of the image processing section 16 with reference to FIG. 5. The image processing section 16 has a line scanner correcting portion 122 corresponding to the line CCD scanner 14. The line scanner correcting portion 122 includes three signal processing systems each having a dark correcting circuit 124, a defective-pixel correcting portion 128, and a light correcting circuit 130, correspondingly to image data of R, G, and B concurrently outputted from the line CCD scanner 14.

Correction in the dark correcting circuit 124 is effected by storing, for each of cells, data inputted from the line CCD scanner 14 (i.e., data which represents a dark output level of each of cells of the sensing portion of the line CCD 116) in the state in which the light made incident on the line CCD 116 is cut off by the shutter and by subtracting the dark output level of a cell corresponding to each pixel from scan image data inputted from the line CCD scanner 14.

Further, the photoelectric conversion characteristic of the line CCD 116 varies for each of the cells. In the light correcting circuit 130 after the defective-pixel correcting portion 128, with an adjusting image whose entire image surface has a constant density being set on the line CCD scanner 14, a gain is set for each of the cells based on image data of the adjusting image inputted from the line CCD scanner 14 after the adjusting image has been read by the line CCD 116 (the variation in density between pixels represented by the image data results from variations of the photoelectric conversion characteristics of the cells), and image data of an image to be read inputted from the line CCD scanner 14 is corrected for each pixel in accordance with the gain set for each of the cells.

On the other hand, when the density of a specified pixel in the image data of the adjusting image is greatly different from that of other pixels, there is some abnormality about the cell of the line CCD 116 corresponding to the specified pixel and it can be determined that the specified pixel is defective. The defective-pixel correcting portion 128 stores an address of the defective pixel based on the image data of the adjusting image. Among the image data of the image to be read which is inputted from the line CCD scanner 14, data of the defective pixel is interpolated by data of peripheral pixels to allow generation of new data.

Further, the line CCD 116 is formed in three lines (rows of CCD cells) which are disposed along the conveying direction of the photographic film 22 at predetermined intervals, and therefore, there is the difference in time at which output of image data of each of component colors of R, G, and B from the line CCD scanner 14 starts between these component colors. The line scanner correcting portion 122 delays the image-data output timing based on different delay times of the component colors so that image data of R, G, and B of the same pixel on the image are outputted simultaneously.

Output ends of the line scanner correcting portion 122 are connected to input ends of a selector 132 and image data outputted from the correcting portion 122 is inputted to the selector 132. The input end of the selector 132 is also connected to a data output end of an input/output controller 134 and external-input file image data is inputted from the input/output controller 134 to the selector 132. An output end of the selector 132 is connected to each data input end of the input/output controller 134 and image processor portions 136A and 136B. The selector 132 allows the inputted image data to be selectively outputted to each of the input/output controller 134 and the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of an image of one frame. The image data inputted from the selector 132 is stored in any one of the three frame memories 142 and the memory controller 138 controls an address when the image data is stored in the frame memory 142 so that the inputted image data respectively corresponding to pixels are stored in a storage region of the frame memory 142 in such a state as to be arranged in a fixed order.

The image processor 140 fetches image data stored in the frame memory 142 and effects various image processing including gradation conversion, color conversion, hyper-tone processing which compresses gradation of extra-low frequency luminance components of an image, hyper-sharpness processing which highlights sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 at a predetermined timing. The image processor portion 136B has the same structure as that of the above-described image processor portion 136A, and a description thereof will be omitted.

In the present embodiment, two reading operations of different resolutions are effected for each image in the line CCD scanner 14. In the case of the first reading operation at a relatively low resolution (which will be referred to as "pre-scan"), even when the density of an image is extremely low (for example, even when an overexposed negative image on a negative film is used), reading of the image is effected under a reading condition which is determined so as to prevent occurrence of saturation of accumulated charge in the line CCD 116 (the amount of light irradiated on the photographic film for each wavelength of light of the colors R, G, and B, and the time of charge accumulated in the CCD). The data obtained by the pre-scan (i.e., pre-scan image data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 calculates, based on pre-scan image data of images of a plurality of frames inputted from the input/output controller 134, a processing condition of the image processing for image data (fine-scan image data) obtained by the second reading operation by the line CCD scanner 14 at a relatively high resolution (which will be hereinafter referred to as "fine scan") and outputs the calculated processing condition to the image processor 140 of the image processor portion 136. In the calculation of the processing condition of the image processing, it is determined from an exposure amount during photographing, a type of a light source for photographing, and other characteristic amount, whether a plurality of images with similar scenes photographed exists. When the plurality of images with similar scenes photographed exists, the processing condition of image processing for fine-scan image data of these images is determined so as to become identical or approximate.

Meanwhile, an optimum processing condition of image processing varies depending on whether image data after image processing is used for recording of an image on a photographic printing paper in the laser printer section 18 or is outputted externally. The image processing section 16 includes two image processor portions 136A, 136B, and therefore, for example, when image data is used for recording of an image on a photographic printing paper and is also outputted externally, the automatic set-up engine 144 calculates a processing condition most suitable for each of various purposes and outputs the calculated processing condition to the image processor portions 136A, 136B. As a result, in the image processor portions 136A, 136B, image processing is effected for the same fine-scan image data under different processing conditions.

Moreover, the automatic set-up engine 144 calculates, based on pre-scan image data of the image inputted from the input/output controller 134, an image-recording parameter which defines gray balance when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164, a keyboard 166 (also seen in FIG. 2), a mouse 177, a hard disk 168, a CD-ROM driver 170, a conveying control portion 172, an extension slot 174, and an image compression/extension portion 176. These components are connected together via a bus 178. The conveying control portion 172 is connected to the film carrier 38 and controls conveying of the photographic film 22 effected by the film carrier 38. Further, when an APS film is set in the film carrier 38, information read from the magnetic layer of the APS film by the film carrier 38 (for example, an image record size) is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Meanwhile, when the pre-scan image data or the like is outputted to the personal computer 158, an image read by the line CCD scanner 14 is shown on the display 164 or an image obtained by being recorded on the photographic printing paper is estimated and shown on the display 164, and an instruction for correction of the image, or the like is given by an operator via the keyboard 166, the image processing section 16 also allows the correction of an image to be reflected in the processing condition for image processing.

Figure 6:
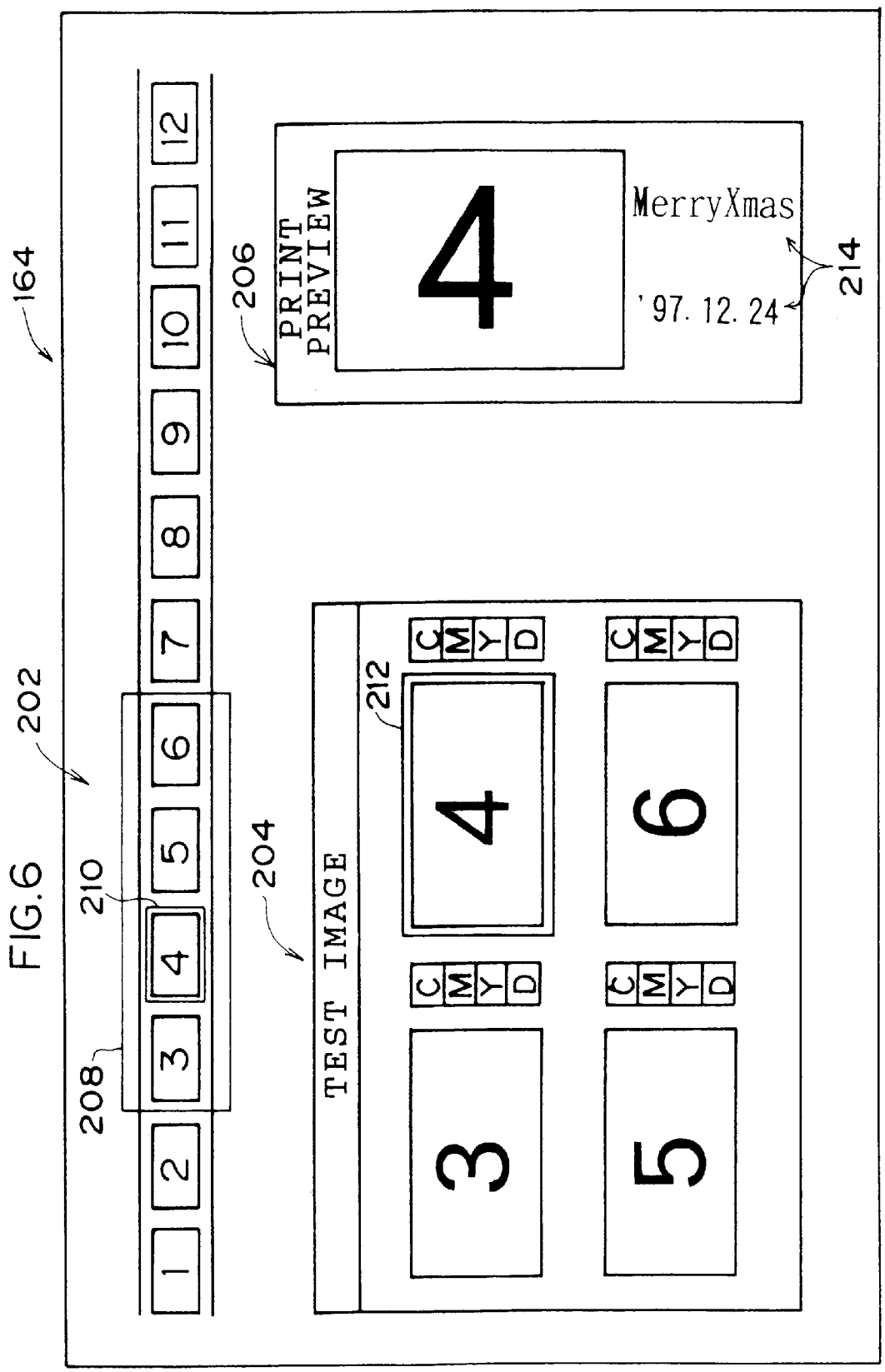
FIG. 6 schematically shows a film monitor image, a test image, and a print preview image.

Image display during a test operation:

At the time of the test operation, the personal computer 158 of this embodiment is, as shown in FIG. 6, structured to allow at least two kinds of images to be simultaneously displayed on the display 164, in accordance with an instruction, among three kinds of images: a film monitor image 202 in which twelve images read by pre-scan are indicated each time; a test image 204 in which images to be subjected to the test operation in the film monitor image 202 are sequentially displayed by fours each time; and a print preview image 206 shown as a final output image in which a character string 214 or a template, prepared in advance by an operator, is set to be composed in an image having been subjected to the test operation.

Further, in the film monitor image 202 including images of twelve frames, a closing line 208 which shows a range corresponding to the images of four frames in the test image 204 and a closing line 210 which shows an image corresponding to one image in the print preview image 206 are displayed. These closing lines 208 and 210 allows the operator to easily understand which images of the film monitor image 202 four frames of the test image 204 and one frame of the print preview image 206 respectively correspond to.

Moreover, in the test image 204 including images of four frames, a closing line 212 which shows an image corresponding to the image of one frame of the print preview image 206 is displayed. The closing line 212 allows the operator to easily understand which image of the test image 204 one of the print preview image 206 correspond to.

Figure 7:
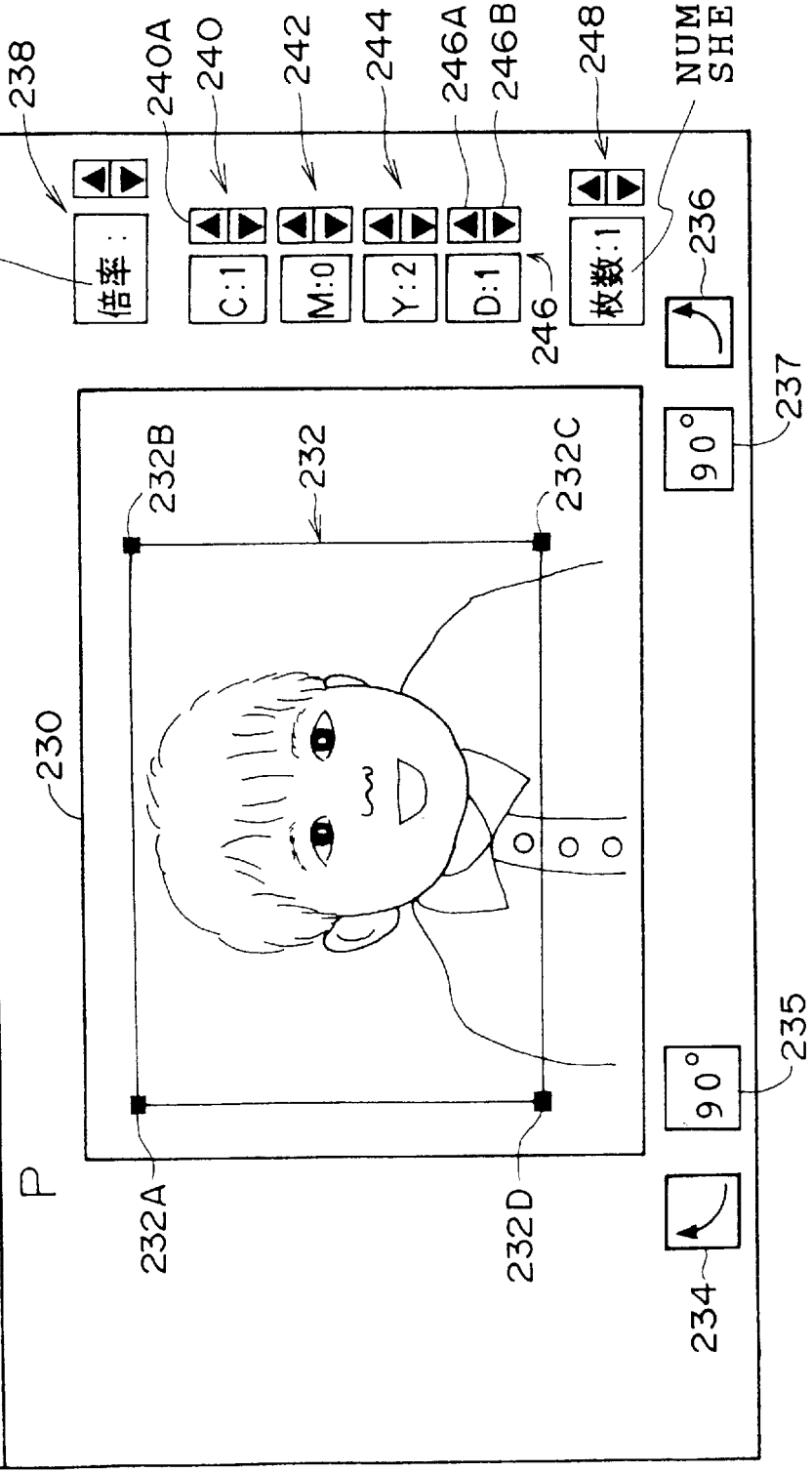
FIG. 7 shows a test image in which one image is displayed.

Next, the test image 204 will be described in detail with reference to FIG. 7. As shown in FIG. 7, an object image 230 is displayed at the center of the test image 204. A first rotation instruction portion 234 for rotating clockwise a displayed entire image around a predetermined point (for example, the central point of the image 230) is provided at the lower left side of the image 230 and a second rotation instruction portion 236 for rotating counterclockwise the displayed entire image around the predetermined point is provided at the lower right side of the image 230. For example, when the displayed entire image is desired to rotate clockwise by a certain (arbitrary) angle, an operator points at the first rotation instruction portion 234 by the mouse 177, and at the point in time the image rotated on the image plane by the pointing of the mouse 177 rotates by a certain (arbitrary) angle, the operator stops push-down of the mouse 177. As a result, the entire image can be rotated clockwise on the image plane by a certain (arbitrary) angle.

Further, a 90°-rotation indicating portion 235 for rotating clockwise the entire image by 90 degrees is provided adjacently on the right side of the first rotation instruction portion 234 and a 90°-rotation instruction portion 237 for rotating counterclockwise the entire image by 90 degrees is provided adjacently on the left side of the second rotation instruction portion 236. The 90° rotation of an image can be indicated at one operation by clicking each 90°-rotation instruction portion 235 and 237 using the mouse 177.

Further, provided on the right side of the image 230 are a magnification designating portion 238 for designating print magnification or cropping magnification of an image, a C-color correcting portion 240 for effecting color correction of cyan, an M-color correcting portion 242 for effecting color correction of magenta, a Y-color correcting portion 244 for effecting color correction of yellow, a density correcting portion 246 for effecting density correction of an entire image, and a number-of-sheets designating portion 248 for designating the number of sheets of prints. A parameter-value adjusting portion including a numerical increase portion indicated by upward arrow and a numerical decrease portion indicated by downward arrow is provided on the right side of each of the above-described correcting portions and designating portion and is operated by the mouse 177 or a cursor key in such a manner as described below so as to effect various corrections and designation. For example, when the density of an entire image is desired to be made still lower, the operator points at a numerical decrease portion 246B of the density correcting portion 246 by the mouse 177 to decrease a density value (for example, density value "1") displayed on the image plane. When the operator stops push-down of the mouse 177 at the point in time the density value becomes a proper value, the density of the entire image can be set at the proper value.

In the image 230, a region setting frame 232 which shows an image region to be print-outputted can be set by moving, by means of the mouse 177, enlargement/reduction handles 232A, 232B, 232C, and 232D (the four enlargement/reduction handles will be hereinafter referred to generically as "232x") provided at four corners of the region setting frame 232. At this time, the region setting frame 232 can be set while an aspect ratio thereof is being fixedly held.

Meanwhile, the aspect ratio of the region setting frame 232 can be set freely for each of standard size, high-vision size, panorama size, and the like. Further, the above-described center of rotation of the image is not limited to the central point of the image 230 and can also be set at the central point of the region setting frame 232 and other arbitrary points.

Further, the above-described region setting frame 232 can also be designated using four cursor moving keys (not shown) provided on the keyboard 166. The four cursor moving keys correspond to upward, downward, left-hand, and right-hand directions, respectively, and when any one of the cursor moving keys is pressed down, the region setting frame 232 is moved in a direction corresponding to the key.

Further, the above-described designation of magnification can be effected using the cursor moving keys. In this case, in addition to the cursor moving keys, a shift key (not shown) provided on the keyboard 166 is used. The shift key provides another meaning for each of other keys in a state of being pressed down. When the cursor moving key corresponding to the upward direction is pressed down while the shift key is being pressed down, an image to be displayed in the image display region 230 can be enlarged. Further, when the cursor moving key corresponding to the downward direction is pressed down while the shift key is being pressed down, an image to be displayed in the image display region can be reduced.

Moreover, the above-described rotation of the image 230 can also be effected using the shift key and the cursor moving keys corresponding to the left-hand and right-hand directions. In this case, when the cursor moving key corresponding to the left-hand direction is pressed down while the shift key is being pressed down, the image 230 can be rotated counterclockwise by one degree at a time. Further, when the cursor moving key corresponding to the right-hand direction is pressed down while the shift key is being pressed down, the image 230 can be rotated clockwise by one degree at a time.

Operation of the first embodiment:

As the operation of the first embodiment, a control routine (see FIG. 11 and FIGS. 12A to 12C) executed by the CPU 160 of the personal computer 158 will be hereinafter described. The film 22 on which an image to be read is recorded may be an APS film or other films such as that in 135 magazines.

Figure 11:
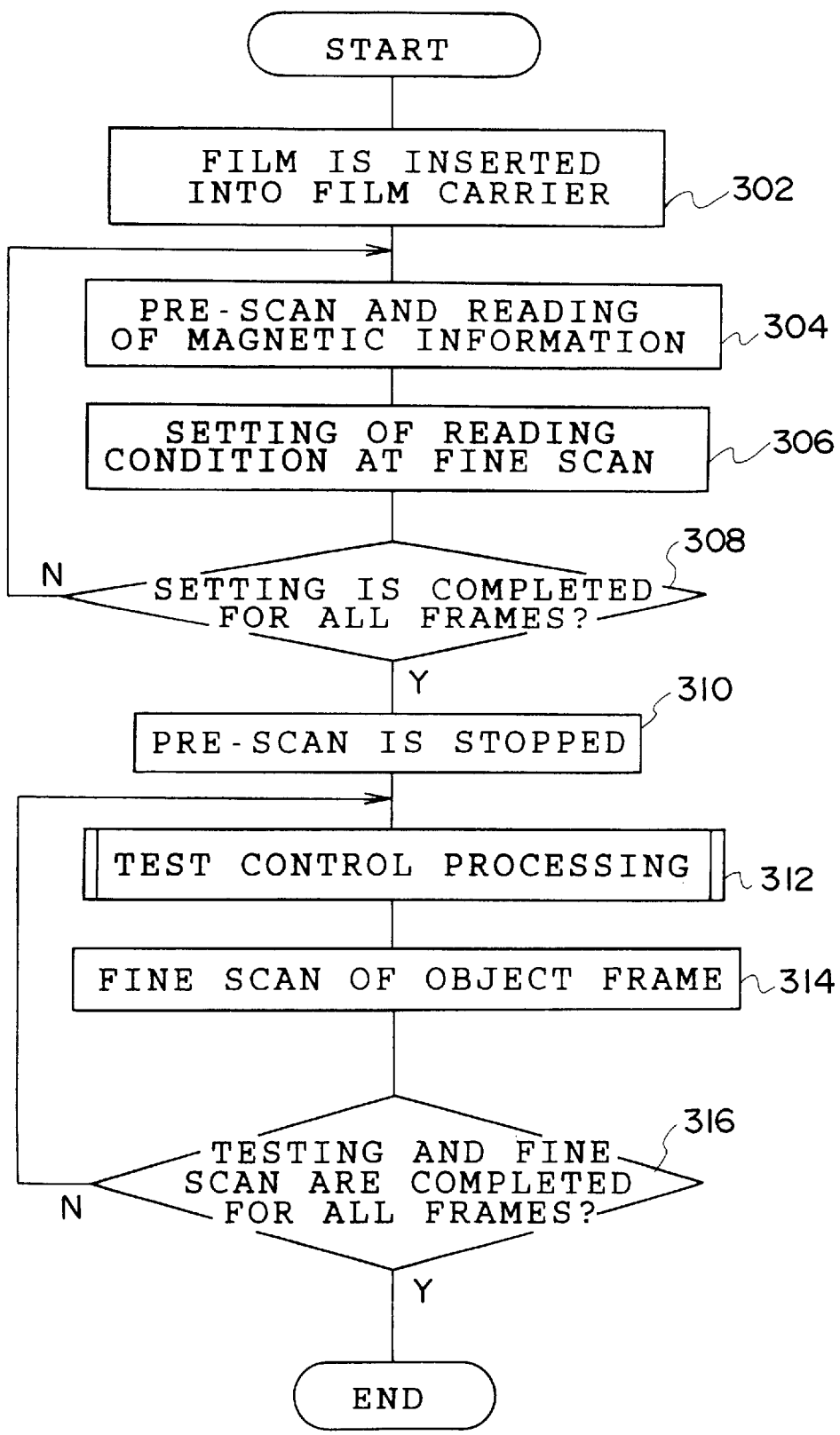
FIG. 11 is a flow chart which shows a control routine in a first embodiment of the present invention.

When the film 22 is inserted by the operator into the insertion opening 38A (see FIG. 2) of the film carrier 38 and a start key 378 of the keyboard 166 is operated, the control routine shown in FIG. 11 starts to be executed by the CPU 160.

Referring now to FIG. 11, in step 302, the film 22 is inserted into the film carrier 38. In step 304, pre-scan for the film 22 starts sequentially from a first frame thereof. In the subsequent step 306, based on image data of each image obtained by pre-scan, a reading condition during fine scan for each image is set. In such a manner as described above, pre-scan and setting of the reading condition during fine scan are executed for each of the images of the film 22.

When the pre-scan and the setting of the reading condition during fine scan have been completed for each of all images, the process proceeds to step 310 and the pre-scan is stopped.

Figure 12A:
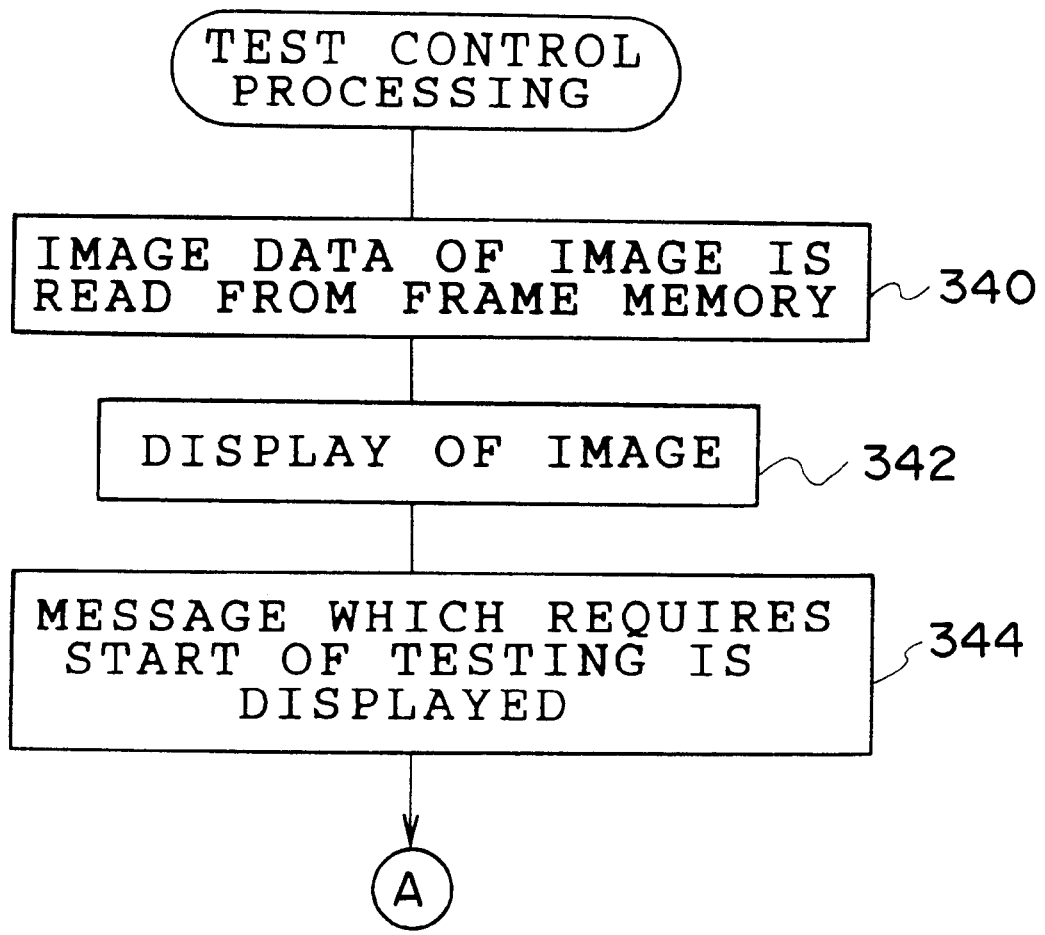
FIGS. 12A, 12B, and 12C in all show a flow chart which illustrates a subroutine of test control processing.
Figure 12B:
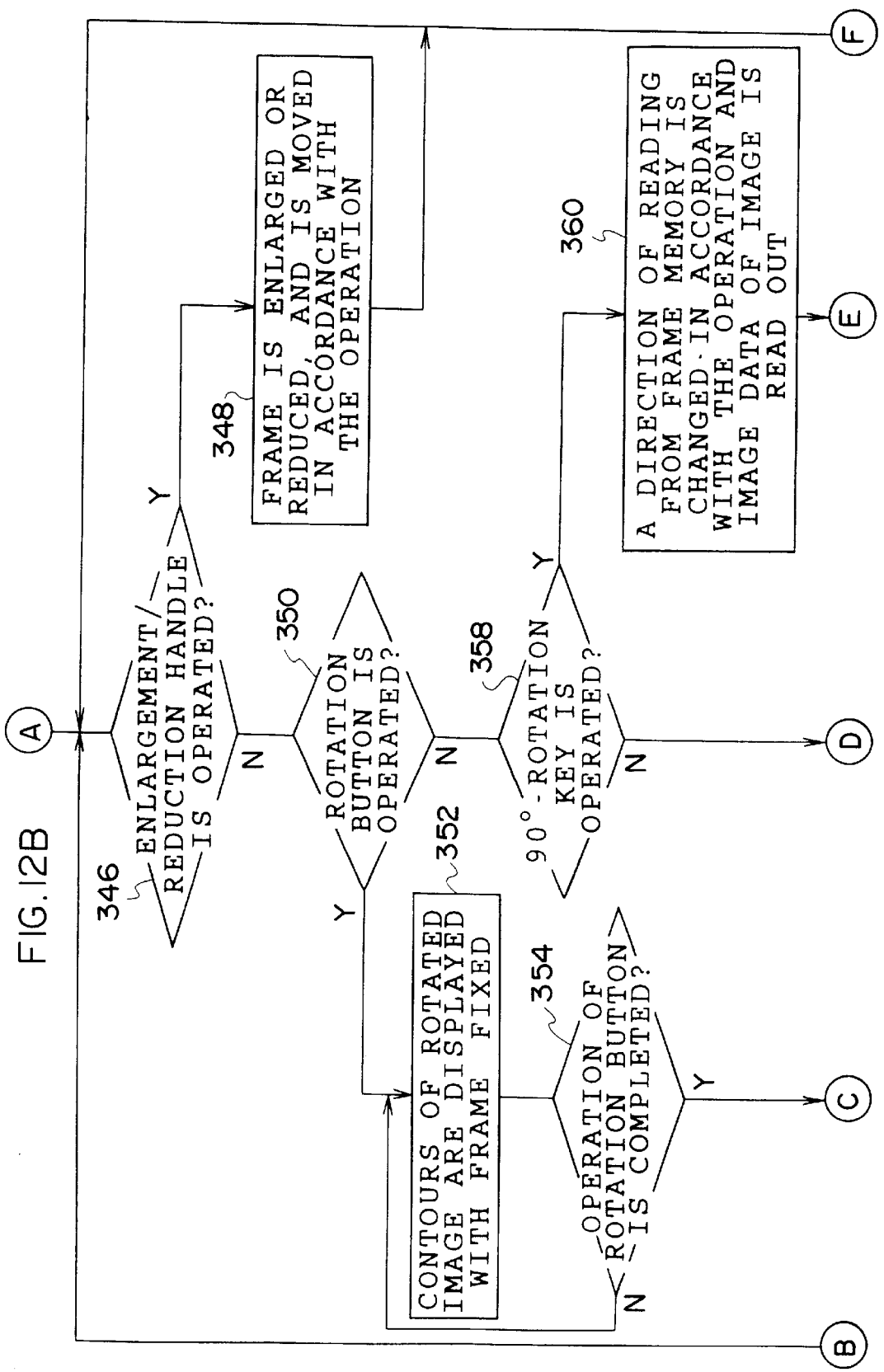
Figure 12C:
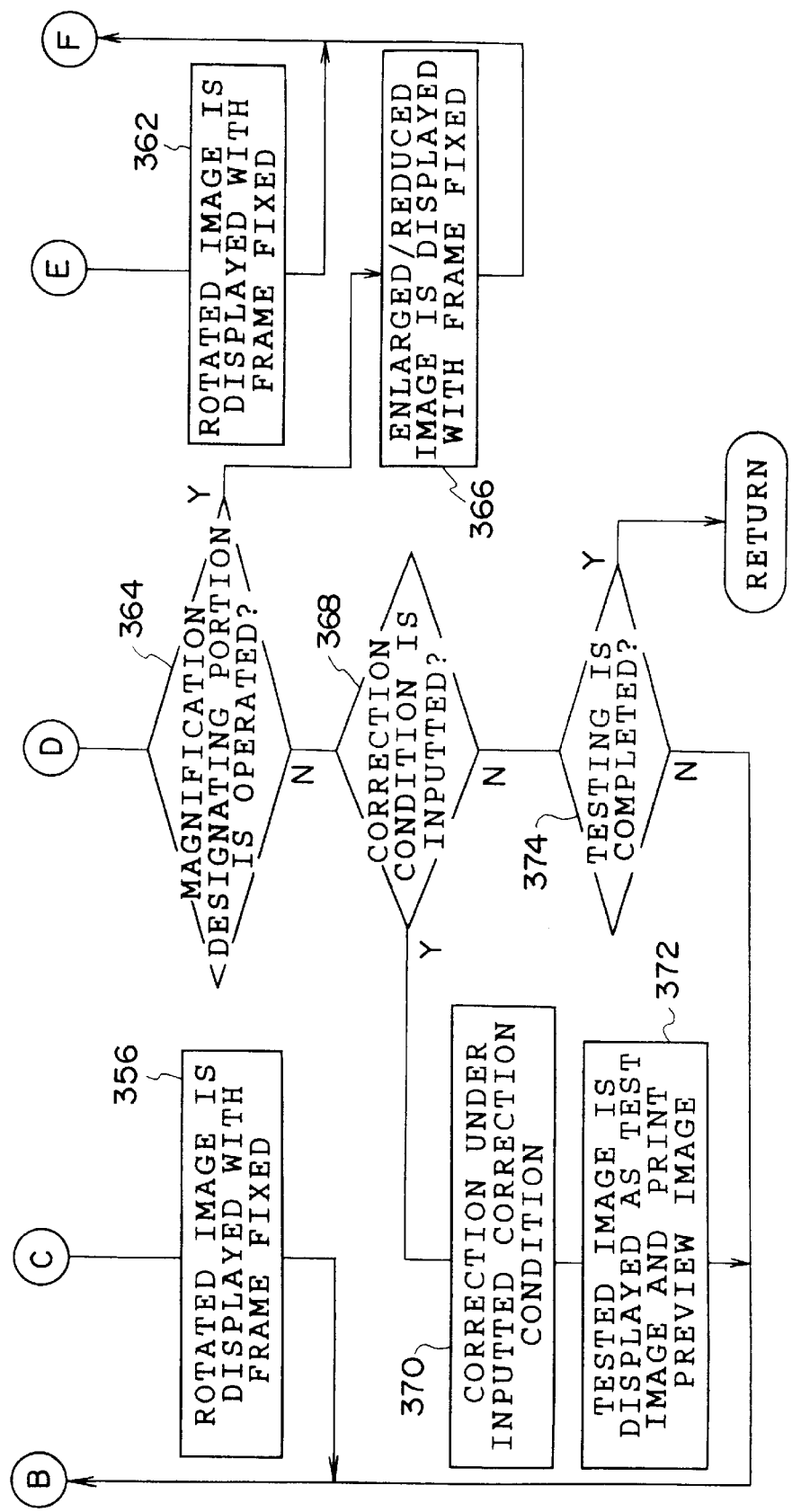

In the subsequent step 312, a subroutine of test control processing shown in FIGS. 12A to 12C is executed. In the test control processing shown in FIGS. 12A to 12C, first, image data of the image finally read by the pre-scan is read from the frame memory 142 (step 340) and an image based on the read image data is displayed in the image display region 230 of the test image 204 shown in FIG. 7 (step 342). Subsequently, a message which requires start of testing is shown on the display 164 (step 344) to cause the operator to effect test processing.

In the test processing, when the enlargement/reduction handle 232x is operated by the operator, the region setting frame 232 is enlarged, reduced, or moved in accordance with the operation of the enlargement/reduction handle 232x (step 348). Meanwhile, the setting of the region setting frame 232 can also be effected by operating the cursor moving keys, corresponding to the upward, downward, left-hand, and right-hand directions, on the keyboard 166.

Further, in the test processing, when any one of the rotation buttons 234 and 236 is operated by the operator, with the region setting frame 232 being fixed during the operation, contours of an image rotated in accordance with the above operation is displayed in the image display region 230 (step 352). Meanwhile, the setting of an angle of rotation can also be effected by operating, together with the shift key on the keyboard 166, the cursor moving keys corresponding to the left-hand and right-hand directions.

Figure 8C:
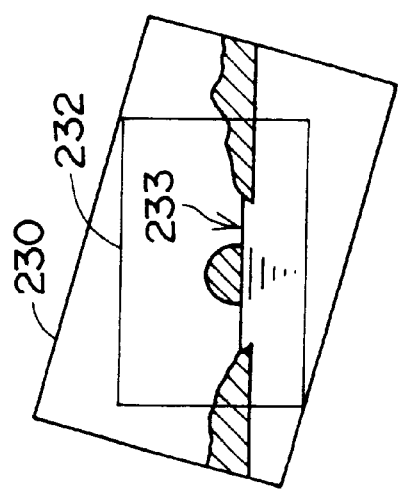
FIG. 8C shows a test image after the rotating operation.
Figure 8B:
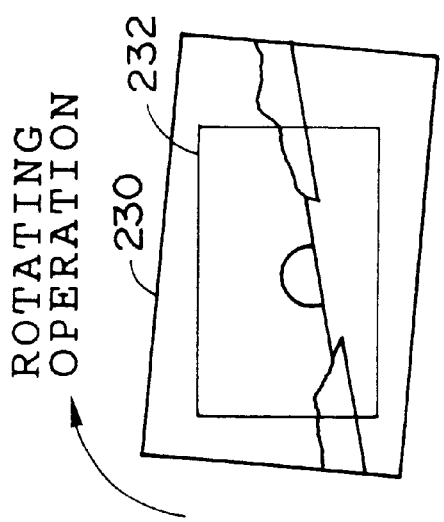
FIG. 8B shows a test image during the rotating operation.
Figure 8A:
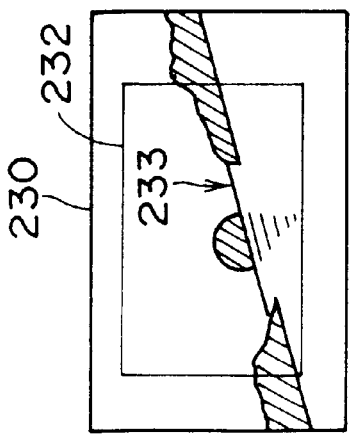
FIG. 8A shows a test image prior to a rotating operation.

For example, as shown in FIG. 8A, when a horizontal line 233 is inclined in an image displayed in the image display region 230, the operator operates the rotation button 234 by the mouse 177 to rotate clockwise the image. During this rotation of the image, as shown in FIG. 8B, only contours of the image is displayed. As described above, during the rotation of the image, a complete image is not displayed and only the contours of the image is displayed. For this reason, it is not necessary to effect image processing for allowing display of the complete image. Accordingly, processing load can be reduced and no high image processing ability is required.

Meanwhile, an image to be displayed during rotation is not limited to contours of the image and may be a monochrome image, a sample image having coarse-grained pixels, or an image in which picture images are each represented by the mark #, or the like.

When the operation of the rotation button by the operator has been completed, as shown in FIG. 8C, the image rotated in accordance with the above operation is displayed in the image display region 230 with the region setting frame 232 being fixed (step 356).

As clearly seen from FIGS. 8A to 8C, in the rotating operation of the image, the rotated image is displayed with the region setting frame 232 fixed, and therefore, the operator can easily confirm an image region within the region setting frame 232 even during the rotation of the image. Further, in the test processing, when any one of the 900-rotation buttons 235 and 237 is operated by the operator, image data of the image is read in such a manner that a direction in which image data is read out from the frame memory 142 is varied in accordance with the operation (step 360). Subsequently, with the region setting frame 232 being fixed, an image based on the above-described read image data, i.e., an image rotated at an angle of 90 degrees, is displayed in the image display region 230 (step 362).

For example, when an input image is an image 260 shown in FIG. 10A, an image of a picture corresponding to image data accumulated in the frame memory 142 is an image 262 shown in FIG. 10B. Usually, image data accumulated in the frame memory 142 is read out in raster order in the direction indicated by arrow A in FIG. 10B (i.e., the same direction as that at the time of writing image data into the frame memory 142). An image based on the image data thus obtained becomes similar to the input image (see FIG. 10A) as illustrated in FIG. 10C.

On the other hand, when the image data accumulated in the frame memory 142 is read out in raster order in the direction indicated by arrow B in FIG. 10B, an image based on the obtained image data becomes an image into which the input image (see FIG. 10A) is rotated counterclockwise at an angle of 90 degrees as illustrated in FIG. 10D. Further, when the image data accumulated in the frame memory 142 is read out in raster order in the direction indicated by arrow C in FIG. 10B, an image based on the obtained image data becomes an image into which the input image (see FIG. 10A) is rotated clockwise at an angle of 90 degrees as illustrated in FIG. 10E.

Namely, when the 90°-rotation button 235 is operated, control is made so that image data of an image is read out from the frame memory 142 in raster order in the direction indicated by arrow C in FIG. 10B. When the 90°-rotation button 237 is operated, control is made so that image data of an image is read out from the frame memory 142 in raster order in the direction indicated by arrow B in FIG. 10B. Accordingly, the operator can easily indicate the rotation of the image at an angle of 90 degrees only by operating any one of the 90°-rotation buttons 235 and 237.

In the test processing, when the magnification designating portion 238 is operated by the operator, an image enlarged or reduced in accordance with the above operation is displayed in the image display region 230 with the region setting frame 232 fixed (step 366).

For example, when an image shown in FIG. 9A is required to be enlarged, the operator points at the numerical increase portion 238A of the magnification designating portion 238 using the mouse 177 or a cursor key. As a result, as shown in FIG. 9B, an image enlarged in accordance with the above operation is displayed in the image display region 230 with the region setting frame 232 fixed. Meanwhile, an image can also be enlarged by pressing down, together with the shift key on the keyboard 166, the cursor moving key corresponding to the upward direction.

Even when display magnification of an image is varied, the region setting frame 232 is fixed. Accordingly, the operator can easily confirm an image region within the region setting frame 232 even when enlargement or reduction of an image in accordance with the display magnification is under execution.

In this case, it is preferable that visibility of the image region within the region setting frame 232 be improved in such a manner that an outside portion 231 (a portion indicated by hatching) of the region setting frame 232 shown in FIG. 9B is displayed lighter than the image region within the region setting frame 232. Further, in order to improve visibility, the outside portion 231 of the region setting frame 232 may be displayed in a whitish state or may be controlled so as not to be displayed by masking.

Further, in the test processing, for example, the operator desires to relatively make the density of cyan higher than those of yellow and magenta, the operator points at the numerical increase portion 240A of the C-color correcting portion 240 indicated in the test image 204 shown in FIG. 7 by the mouse 177. When a correction condition of color balance or density of an entire image is inputted by the operator, an image to be tested is corrected based on the inputted correction condition (step 370) and the corrected image is displayed as the test image 204 and also as the print preview image 206 (see FIG. 6)(step 372). Then, the process returns to step 346.

Each time the correction condition of color balance or density of an entire image is inputted by the test processing, a final output image of an image corrected based on the inputted correction condition is displayed at real time. Meanwhile, an original image of the image to be tested can be referred to by the film monitor image 202 which is displayed as occasion demands.

Subsequently, each time any one of the enlargement/reduction handle 232x, the rotation buttons 234 and 236, the 90°-rotation keys 235 and 237, the magnification designating portion 238, and the input portions 240 to 246 for the correction condition of the image is operated, the image processing operation corresponding to each of the above-described operation keys is effected.

When desired image processing operation and input operation of the correction condition have been completed, the operator operates a start key 378 to indicate a completion of test of an object image. When the completion of test is indicated by the operator, the process returns from the subroutine shown in FIGS. 12A to 12C to the main routine shown in FIG. 11. At this point in time, the operator can indicate that an image displayed as the print preview image 206 (see FIG. 6) in step 372 be printed after completion of fine scan, which will be described later.

In step 314 of the main routine shown in FIG. 11, fine scan is executed for an object image (a first one is an image for which pre-scan has been finally effected). The fine scan operation is effected in an order opposite to that of frames at the time of pre-scan while the film 22 is rewound.

When printing of the image after completion of fine scan is indicated by the operator, after completion of fine scan for the object image, an image based on digital image data obtained by fine scan is print-outputted by the output section 28 shown in FIG. 2.

In the subsequent step 316, it is determined whether the test operation and fine scan have been completed for all frames. When the test operation and fine scan have not been completed for all frames, the process returns to the test control processing of step 312 and proceeds to the test operation for a subsequent image.

The test operation and fine scan are, as described above, executed for each of all frames, and at the point in time the test operation and fine scan have been completed for all frames, the control routine shown in FIG. 11 ends. Since fine scan is executed while the film 22 is rewound, rewinding of the film 22 is completed at the same time as the completion of fine scan and the film 22 is discharged from the film carrier 38.

In the first embodiment described above, the operator can designate freely and easily a region which is required to be extracted from an image as an image to be outputted by designating the position and size of the region setting frame 232 using the enlargement/reduction handle 232x. Accordingly, different from a conventional system, it becomes unnecessary to use a dedicated carrier or mask and the number of parts to be required can be reduced accordingly. Further, operability at the time of cropping an image can be greatly improved.

Further, the operator operates the rotation buttons 234 and 236, the 90°-rotation keys 235 and 237, and the magnification designating portion 238 to freely rotate or enlarge/reduce an image displayed as the test image 204 in a simple manner. Namely, an image within the region setting frame 232 can be freely changed and an image region which is required to be extracted, as an image to be outputted, from an image can be freely designated in a simple manner.

In the first embodiment, the image region which is required to be extracted as an image to be outputted is displayed by the region setting frame 232. However, the image region to be extracted may be displayed by four points which indicate four corners of the image region to be extracted or the image region to be extracted may be visualized by varying color or density between the inside and outside of the image region to be extracted.

Further, in the first embodiment, there was described an example in which an image based on digital image data obtained by pre-scan for an image recorded on the film 22 is displayed as the test image. However, an image based on digital image data obtained by fine scan for an image recorded on the film 22 may be displayed as the test image. Further, an image based on digital image data inputted from an external image processing apparatus or the like via a network may also be displayed as the test image, and the above-described image processing operation can be realized in this case as well.

Moreover, in the first embodiment, these was also shown an example in which two reading operations, i.e., pre-scan and fine scan are effected for each of images. However, the number of time of a reading operation may be set at one in such a manner that only fine scan is effected for each image at a high resolution. For example, when only fine scan is effected, a pixel-sampled image or a gradation-limited image may be displayed as the test image 204.

Second Embodiment

Next, a description will be given of a second embodiment which corresponds to the seventh aspect of the present invention. It should be noted that the structure of an entire system, and the like are the same as those of the first embodiment, and a description thereof will be omitted.

As the operation of the second embodiment, horizontal adjustment processing of an image displayed in the image display region 230 of the test image 204 will be first described with reference to the flow chart shown in FIG. 14.

Figure 13:
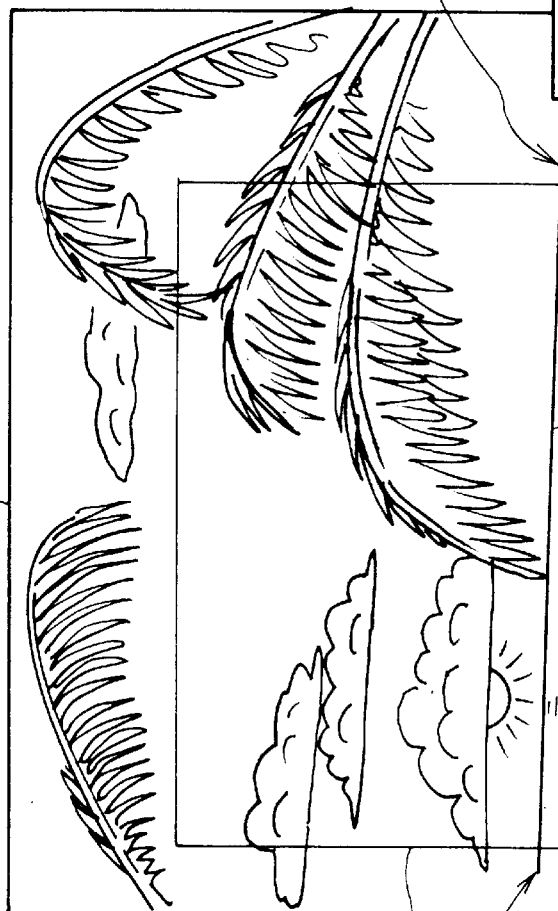
FIG. 13 shows a test image in a second embodiment of the present invention.
Figure 14:
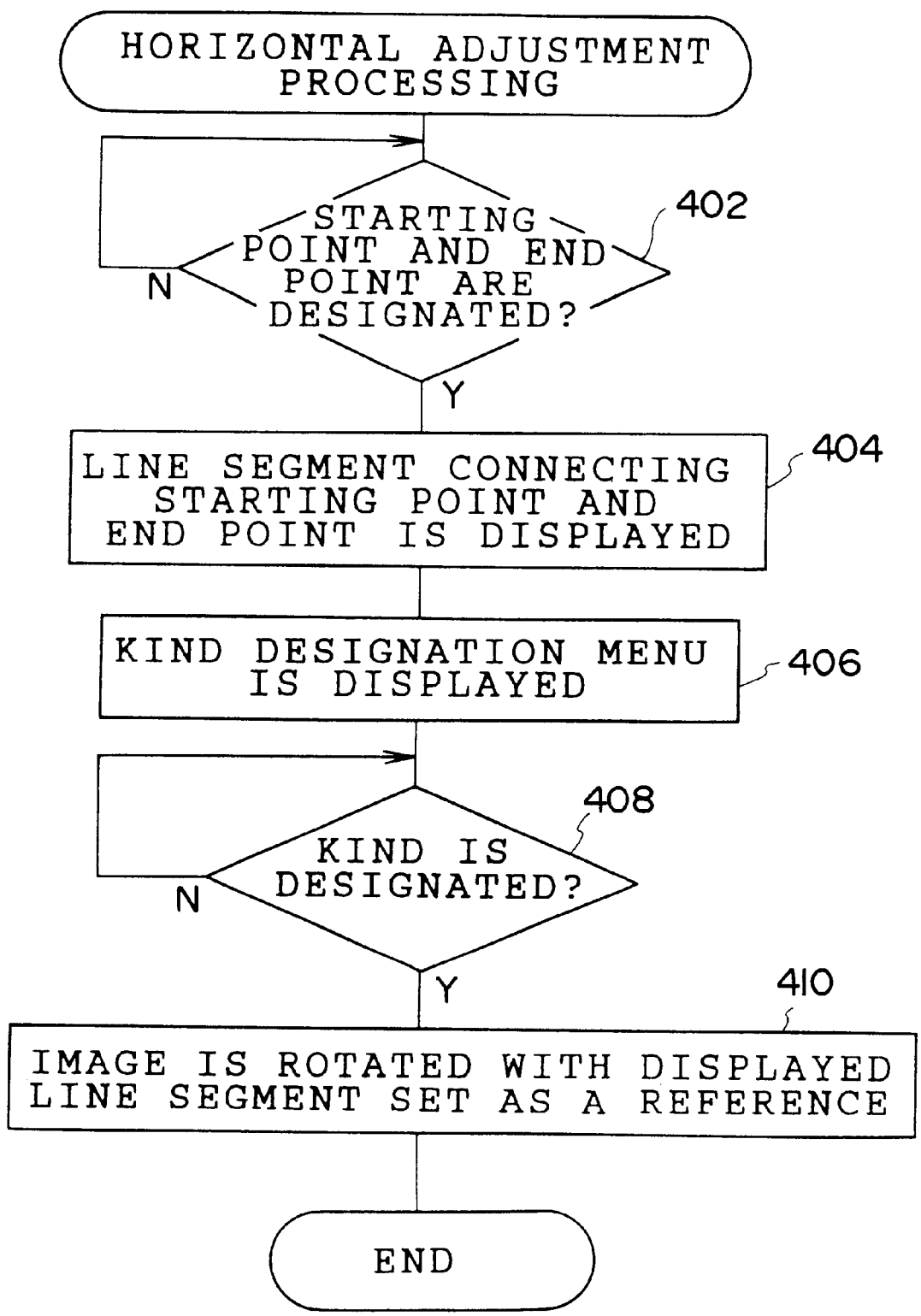
FIG. 14 is a flow chart which shows a process routine for horizontal adjustment processing in the second embodiment.

In step 402 of FIG. 14, it is checked whether a starting point and an end point have been designated. As shown in FIG. 13, when the starting point S and the end point E have been designated by the operator using the mouse 177, the process proceeds to step 404, in which a line segment 270 connecting the starting point S and the end point E is displayed within the test image 204.

In step 406, as shown in FIG. 13, a kind designation menu 280 for designating the kind of the line segment 270 is displayed within the test image 204 and the process is placed in a state of waiting for the operator to designate the kind (step 408).

When the kind is designated by the operator, the process proceeds to step 410, in which an image is rotated with the displayed line segment 270 as a reference. For example, when an item of horizontal line 282 is designated on the kind designation menu 280 as illustrated in FIG. 13, horizontal adjustment of an image displayed in the image display region 230 is made so that the line segment 270 is located as a horizontal line in the image display region 230.

According to the above-described horizontal adjustment processing, the operator can simply and properly correct orientation of an image only by designating the line segment based on the starting point and the end point and designating the kind of the line segment.

In the horizontal adjustment processing, the kind of a line segment may be designated prior to the designation of the line segment based on the starting point and the end point. Namely, the process from step 402 to step 404 in FIG. 14 and the process from step 406 to step 408 may be executed in the reversed order.

Third Embodiment

Next, a description will be given of a third embodiment which corresponds to the eighth aspect of the present invention. It should be noted that the structure of an entire system, and the like are the same as those of the first embodiment, and a description thereof will be omitted.

Figure 16:
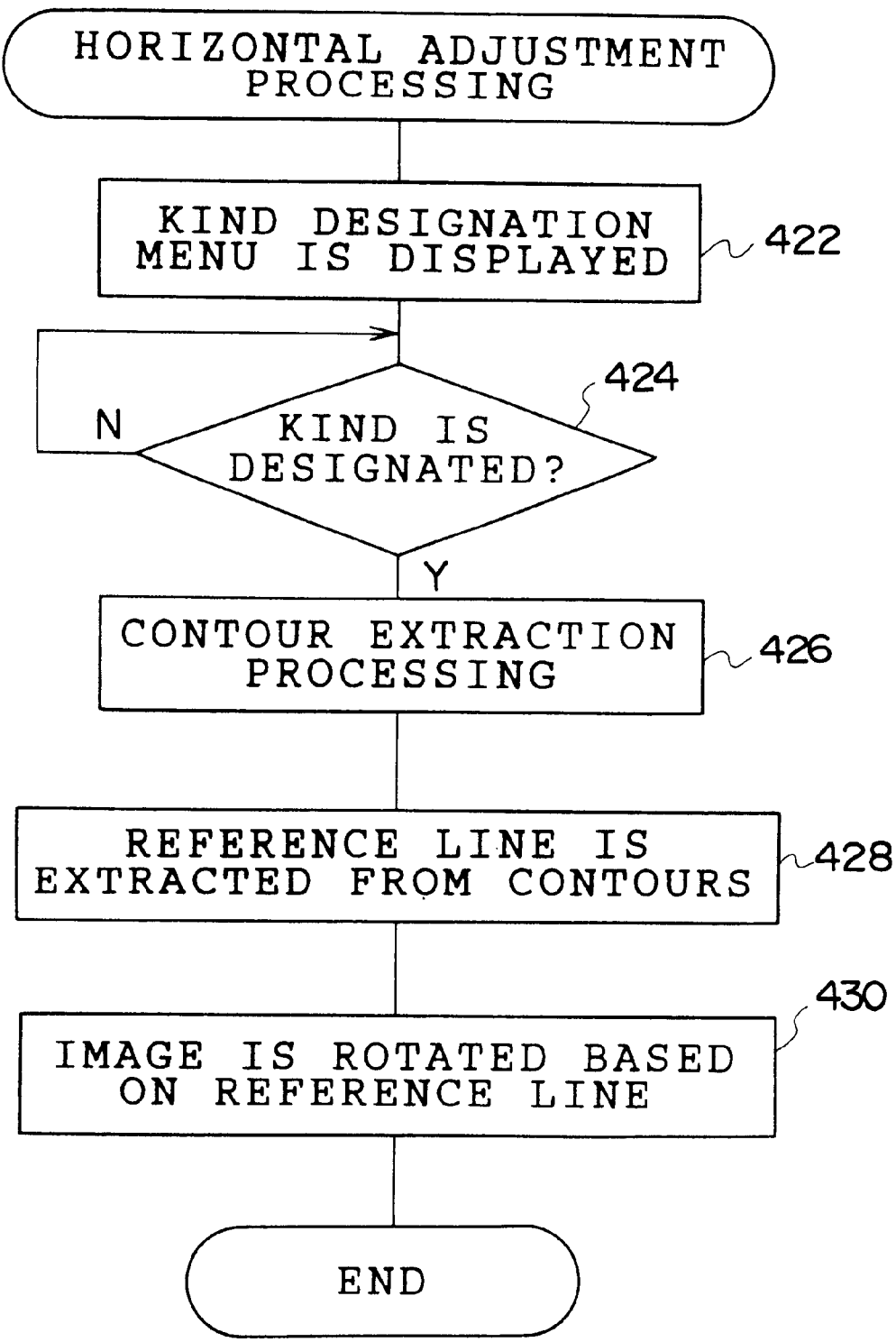
FIG. 16 is a flow chart which shows a process routine for horizontal adjustment processing in a third embodiment of the present invention.

As the operation of the third embodiment, a process for automatic horizontal adjustment of an image displayed in the image display region 230 of the test image 204 will be described with reference to the flow chart shown in FIG. 16.

In step 422 of FIG. 16, the kind designation menu 280 for designating the kind of a line set as a reference for horizontal adjustment (which will be hereinafter referred to as a structural line) is displayed within the test image 204 as shown in FIG. 13 and the process is placed in a state of waiting for the operator to designate the kind (step 424).

When the kind of the structural line is designated by the operator, the process proceeds to step 426 and a known contour extraction processing for an input image 290 as shown in FIG. 15A is executed to prepare a structural-line determining image 294 which represents only contours as shown in FIG. 15B, and the prepared image is displayed in the test image 204.

In step 428, the likeliest line to be extracted as the structural line is extracted from the structural-line determining image 294 based on the following criteria:
(1) a continuous line from an end to an end of the structural-line determining image 294;
(2) a line which can be approximated by a straight line; and
(3) a line which can be clearly seen within the structural-line determining image 294.

When a plurality of lines proposed as the structural line exist, the structural line to be extracted may be selected by the operator.

In step 430, an image is rotated with the likeliest structural line as a reference. For example, when a horizontal line is designated as the kind of the structural line and a line 296 proposed as the structural line is extracted in the structural-line determining image 294 shown in FIG. 15B, horizontal adjustment of an image displayed in the image display region 230 is made so that the line 296 proposed as the structural line becomes a horizontal line in the image display region 230.

According to the above-described horizontal adjustment processing, the operator can properly and simply correct the orientation of an image by merely designating the kind of a structural line to automatically extract a line proposed as a structural line and by rotating the image in accordance with the extracted line proposed as the structural line.

In the horizontal adjustment processing, the kind of a structural line may be designated in advance. For example, horizontal adjustment of an image can be all automatically effected based on an operator's instruction for starting the horizontal adjustment with the kind of a structural line being in advance designated as a horizontal line.

As described above, according to the first aspect of the present invention, the operator can freely and simply designate a region of an image, which is required to be extracted as an image to be outputted, by designating the position and size of a region using region designation means. Accordingly, a dedicated carrier or mask, which has been conventionally used, becomes unnecessary and the number of parts to be required can be reduced. Further, operability at the time of cropping an image can be greatly improved.

According to the second aspect of the present invention, with a region displayed on information display means being fixed, an image displayed on the information display means is enlarged or reduced in accordance with a display magnification. Accordingly, the operator can easily confirm an image region within the region even during execution of enlargement or reduction of the image in accordance with the display magnification, thereby resulting in improvement of operability at the time of cropping an image.

According to the third aspect of the present invention, the operator can freely designate a region of an image, which is required to be extracted as an image to be outputted, in a simple manner by rotating an image displayed on information display means at a certain (arbitrary) angle using rotation designation means to vary freely the image region within the region.

According to the fourth aspect of the present invention, with a region displayed on information display means being fixed, an image displayed on the information display means is rotated. Accordingly, the operator can easily confirm an image region within the region even during rotation of the image, so as to further improve operability at the time of cropping an image.

According to the fifth aspect of the present invention, a simple image is displayed during rotation of an image, and therefore, no useless image processing is required and a processing load can be reduced, and further, provision of an apparatus having a high processing ability also becomes unnecessary.

According to the sixth aspect of the present invention, the rotation of an image at an angle of 90 degrees can be indicated simply only by operating the 90°-rotation designation means once. Accordingly, operability at the time of cropping can be further improved.

According to the seventh aspect of the present invention, it is possible to rotate an image in accordance with an operator's instruction for a rotation reference line to properly correct orientation of the image.

According to the eighth aspect of the present invention, when rotation of an image is indicated by the operator, a rotation reference line can be automatically extracted, and an image is rotated in accordance with the extracted rotation reference line so that the orientation of the image can be properly corrected.

What is claimed is:

1. An image processing apparatus in which, based on digital image data of an image recorded on a recording medium, digital image data of an image to be recorded onto a recording material is prepared, comprising:

information display means which displays information;

display control means which allows display, on said information display means, of an image based on digital image data of the image recorded on the recording medium and a region for extracting, from the image recorded on the recording medium, the image to be recorded onto the recording material;

region designation means for designating a position and a size of the region; and determination means which determines the image to be recorded onto the recording material based on the region whose position and size are designated by said region designation means.

2. An image processing apparatus according to claim 1, further comprising:

magnification designating means for designating a display magnification of an image displayed on said information display means, wherein, when a display magnification is designated by said magnification designating means, on the basis of the designated display magnification, said display control means enlarges or reduces the image displayed on said information display means while the region displayed on the information display means remains fixed.

3. An image processing apparatus according to claim 1, further comprising:

rotation instruction means for giving an instruction for rotation, at an arbitrary angle, of an image displayed on said information display means, wherein, based on the instruction by said rotation instruction means, said display control means rotates at an arbitrary angle the image displayed on said information display means, and said determination means determines, based on the region and on the image which has been rotated based on the instruction, the image to be recorded onto the recording material.

4. An image processing apparatus according to claim 3, wherein, when the rotation based on the instruction is effected, said display control means rotates the image displayed on said information display means while the region displayed on said information display means remains fixed.

5. An image processing apparatus according to claim 3, wherein during the rotation based on the rotation instruction, said display control means allows display of a simple image which indicates at least orientation of the image.

6. An image processing apparatus according to claim 4, wherein during the rotation based on the rotation instruction, said display control means allows display of a simple image which indicates at least orientation of the image.

7. An image processing apparatus according to claim 3, wherein said rotation instruction means includes 90°-rotation instruction means for giving an instruction for rotation by 90° of the image displayed on said information display means.

8. An image processing apparatus according to claim 4, wherein said rotation instruction means includes 90°-rotation instruction means for giving an instruction for rotation by 90° of the image displayed on said information display means.

9. An image processing apparatus according to claim 5, wherein said rotation instruction means includes 90°-rotation instruction means for giving an instruction for rotation by 90° of the image displayed on said information display means.

10. An image processing apparatus according to claim 3, wherein said rotation instruction means includes reference-line indicating means for indicating a rotation reference line as a reference for rotation of an image, and based on the rotation reference line indicated by said reference-line indicating means, said display control means rotates the image displayed on said information display means.

11. An image processing apparatus according to claim 4, wherein said rotation instruction means includes reference-line indicating means for indicating a rotation reference line as a reference for rotation of an image, and based on the rotation reference line indicated by said reference-line indicating means, said display control means rotates the image displayed on said information display means.

12. An image processing apparatus according to claim 5, wherein said rotation instruction means includes reference-line indicating means for indicating a rotation reference line as a reference for rotation of an image, and based on the rotation reference line indicated by said reference-line indicating means, said display control means rotates the image displayed on said information display means.

13. An image processing apparatus according to claim 6, wherein said rotation instruction means includes reference-line indicating means for indicating a rotation reference line as a reference for rotation of an image, and based on the rotation reference line indicated by said reference-line indicating means, said display control means rotates the image displayed on said information display means.

14. An image processing apparatus according to claim 7, wherein said rotation instruction means includes reference-line indicating means for indicating a rotation reference line as a reference for rotation of an image, and based on the rotation reference line indicated by said reference-line indicating means, said display control means rotates the image displayed on said information display means.

15. An image processing apparatus according to claim 8, wherein said rotation instruction means includes reference-line indicating means for indicating a rotation reference line as a reference for rotation of an image, and based on the rotation reference line indicated by said reference-line indicating means, said display control means rotates the image displayed on said information display means.

16. An image processing apparatus according to claim 9, wherein said rotation instruction means includes reference-line indicating means for indicating a rotation reference line as a reference for rotation of an image, and based on the rotation reference line indicated by said reference-line indicating means, said display control means rotates the image displayed on said information display means.

17. An image processing apparatus according to claim 3, further comprising:

reference-line extraction means which, when rotation of an image is indicated by said rotation instruction means, extracts a rotation reference line as a reference for rotation of the image from the image displayed on said information display means, wherein said display control means rotates the image displayed on said information display means based on the rotation reference line extracted by said reference-line extraction means.

18. An image processing apparatus according to claim 4, further comprising:

reference-line extraction means which, when rotation of an image is indicated by said rotation instruction means, extracts a rotation reference line as a reference for rotation of the image from the image displayed on said information display means, wherein said display control means rotates the image displayed on said information display means based on the rotation reference line extracted by said reference-line extraction means.

19. An image processing apparatus according to claim 5, further comprising:

reference-line extraction means which, when rotation of an image is indicated by said rotation instruction means, extracts a rotation reference line as a reference for rotation of the image from the image displayed on said information display means, wherein said display control means rotates the image displayed on said information display means based on the rotation reference line extracted by said reference-line extraction means.

20. An image processing apparatus according to claim 6, further comprising:

reference-line extraction means which, when rotation of an image is indicated by said rotation instruction means, extracts a rotation reference line as a reference for rotation of the image from the image displayed on said information display means, wherein said display control means rotates the image displayed on said information display means based on the rotation reference line extracted by said reference-line extraction means.

21. An image processing apparatus according to claim 7, further comprising:

reference-line extraction means which, when rotation of an image is indicated by said rotation instruction means, extracts a rotation reference line as a reference for rotation of the image from the image displayed on said information display means, wherein said display control means rotates the image displayed on said information display means based on the rotation reference line extracted by said reference-line extraction means.

22. An image processing apparatus according to claim 1, wherein said display control means determines whether a display region is to be displayed.

23. An image processing apparatus according to claim 1, further comprising:

selection means which determines whether an image in a region with no image to be recorded on the recording material being included is to be displayed or not, wherein said display control means displays an image on said information display means based on a display form selected by said selection means.

24. An image processing apparatus according to claim 2, further comprising:

selection means which determines whether an image in a region with no image to be recorded on the recording material being included is to be displayed or not, wherein said display control means displays an image on said information display means based on a display form selected by said selection means.

25. An image processing apparatus according to claim 3, further comprising:

selection means which determines whether an image in a region with no image to be recorded on the recording material being included is to be displayed or not, wherein said display control means displays an image on said information display means based on a display form selected by said selection means.

* * * * *